(12) United States Patent
Ben-Levy et al.

(10) Patent No.: US 7,447,654 B2
(45) Date of Patent: Nov. 4, 2008

(54) COMPUTER TRADING OF FINANCIAL INTERESTS

(75) Inventors: Shai Ben-Levy, East Hills, NY (US); Kenneth L. Gaertner, Hastings-on-Hudson, NY (US); George A. Geyer, New York, NY (US); David P. Mullen, Stamford, CT (US); Todd A. Sibilla, Warren, NJ (US)

(73) Assignee: Bloomberg L.P., New York, NY (US)

( * ) Notice: Subject to any disclaimer, the term of this patent is extended or adjusted under 35 U.S.C. 154(b) by 1081 days.

(21) Appl. No.: 09/943,442

(22) Filed: Aug. 30, 2001

(65) Prior Publication Data

US 2002/0111896 A1    Aug. 15, 2002

Related U.S. Application Data

(60) Provisional application No. 60/229,173, filed on Aug. 30, 2000.

(51) Int. Cl.
*G06Q 40/00*    (2006.01)
(52) U.S. Cl. .......................... 705/37; 705/35
(58) Field of Classification Search ............. 705/35–40
See application file for complete search history.

(56) References Cited

U.S. PATENT DOCUMENTS

| | | | |
|---|---|---|---|
| 3,581,072 A | 5/1971 | Nymeyer | |
| 4,674,044 A | 6/1987 | Kalmus et al. | |
| 4,789,928 A | 12/1988 | Fujisaki | |
| 5,077,665 A | 12/1991 | Silverman et al. | |
| 5,101,353 A | 3/1992 | Lupien et al. | |
| 5,136,501 A | 8/1992 | Silverman et al. | |
| 5,297,031 A | 3/1994 | Gutterman et al. | |
| 5,297,032 A | 3/1994 | Trojan et al. | |
| 5,375,055 A | 12/1994 | Togher et al. | |
| 5,517,406 A | 5/1996 | Harris et al. | |

(Continued)

FOREIGN PATENT DOCUMENTS

GB    2258061 A    1/1993
WO    WO 00/55775    9/2000

OTHER PUBLICATIONS

BuyTextile.com, 1999.*

(Continued)

*Primary Examiner*—Hani M. Kazimi
*Assistant Examiner*—Olabode Akintola
(74) *Attorney, Agent, or Firm*—Frank J. DeRosa; David V. Rossi; Frommer Lawrence & Haug LLP

(57) ABSTRACT

Methods, systems, and apparatus for improved trading of financial interests via a computer network are disclosed. Improvements include crossing or commingling of auction and non-auction transaction proposals; disclosure of high bids and of identify of high bidders and offerors during the auction process; presentation of reference benchmark prices and benchmark-derived price references; immediate rescission of multiple proposed transactions in case of emergency; time-limited passwords; assignment of user access level classes; keyword tagging or identification of offers or bids; the use of multiple data sets or trading channels to enable separation of accounting and to accommodate training and familiarization efforts; enabling the creation of data sets in outside programs and subsequent and optionally repeated uploading or importation of data to the auction system; and staging of transactions for supervisory review. The invention includes methods and processes as well as suitable computer programs and data processing systems.

9 Claims, 42 Drawing Sheets

U.S. PATENT DOCUMENTS

| | | | |
|---|---|---|---|
| 5,535,383 | A | 7/1996 | Gower |
| 5,689,652 | A | 11/1997 | Lupien et al. |
| 5,724,524 | A | 3/1998 | Hunt et al. |
| 5,758,328 | A | 5/1998 | Giovannoli |
| 5,809,483 | A | 9/1998 | Broka et al. |
| 5,835,896 | A | 11/1998 | Fisher et al. |
| 5,845,265 | A * | 12/1998 | Woolston ............... 705/37 |
| 5,845,266 | A | 12/1998 | Lupien et al. |
| 5,905,974 | A | 5/1999 | Fraser et al. |
| 5,905,975 | A | 5/1999 | Ausubel |
| 5,915,209 | A * | 6/1999 | Lawrence ............. 340/3.7 |
| 5,924,082 | A | 7/1999 | Silverman et al. |
| 5,924,083 | A | 7/1999 | Silverman et al. |
| 5,950,177 | A | 9/1999 | Lupien et al. |
| 6,014,643 | A | 1/2000 | Minton |
| 6,021,398 | A | 2/2000 | Ausubel |
| 6,029,146 | A | 2/2000 | Hawkins et al. |
| 6,035,287 | A | 3/2000 | Stallaert et al. |
| 6,055,518 | A | 4/2000 | Franklin et al. |
| 6,131,087 | A | 10/2000 | Luke et al. |
| 6,151,589 | A | 11/2000 | Aggarwal et al. |
| 6,161,099 | A | 12/2000 | Harrington et al. |
| 6,223,167 | B1 | 4/2001 | Alaia et al. |
| 6,317,727 | B1 | 11/2001 | May |
| 6,618,707 | B1 * | 9/2003 | Gary ................... 705/36 R |

OTHER PUBLICATIONS

"eCommerce in the U.S. Fixed Income Markets", "The 1999 Review of Electronic Transaction Systems", The Bond Market Association, Nov. 1999. (36 PP).

"Getting the Word Out to the Right Muni Dealers", Bloomberg, Oct. 1996, p. 85, 87.

"Government Bond Trading Made Easy", Bloomberg, Jun. 1999, pp. 86-88.

"Bloomberg Financial Markets Commodities News", Bloomberg L.P., Aug. 1, 1998 (11 pp).

"And now-electronic bidding" Grant's Municipal Bond Issuer, vol. 2, No. 14, Jul. 16, 1998 (4 pp).

"Innovative Trading in the Nasdaq Marketplace" User Manual, Bloomberg Tradebook Europe Ltd., Jun. 1999.

"Real Bids. Institutional Investors Begin Using Electronic Bond Trading", The Bank of New York Company, Inc. Apr. 8, 1998 (1 pg).

"Real Bids. The Bank of New York to Aquire Automated Bond Trading System", The Bank of New York Company, Inc. Apr. 19, 1997.

"The Automation of Captial Markets" Arnold Picot, Christine Bortenlaenger and Heiner Roehrl, Institute of Organization, Munich, Germany, Circa 1996 (20 pp).

"TradeWeb Launches First Multi-Dealer Electronic Trading System for Fixed-Income Securities" EDI Update International The Global Review of Electronic Trade, Oct. 1997, vol. IX, No. 11 (1 pg).

"What Corporate Traders Could Learn from Munis", Bloomberg Sep. 1993 (pp. 16-17).

* cited by examiner

Menu
Enter # <GO> to view
Create New Class   Panic   Links
16:56:16 (UCL)

prsblg1 n223 Govt   UCM — 327

USER-CLASS MANAGER
Firm: BETS TEAM

Page 1/1

Define Class   View/Edit
Attributes     Members of Class      Class Name 1)
2)
3)            21)                    Firm Principal    2 Users
4)            22)                    Firm Manager      No Users
5)            23)                    Trader            No Users
              24)                    Back Office       No Users
              25)                    My Trader         No Users © Copyright 2000, Bloomberg LP

Fig. 7

<HELP> for explanation
Please enter user short name and/telephone number ig2 dgi5 Govt UCM — 327

455

| Create New Class | Delete Class=2<GO>Change Class' Name | Panic | Units |

BETS USER-CLASS ENTITLEMENT SETUP
BETS Firm: BETS TEAM
Class: Trader
  User UUID: 927902    User name: DIANA DING Identification
  User short name                                    Default
  User telephone number Security
  Require a password when trading           335 { Y     ■ min    } 336
  Password expiration period in minutes         { 15

Revealing offering information to bidders
  Show reserve to all others                  338 { Y     ■■■ Y  } 339
340 — Show high bid on offerings to all others      { Y            N
341 — User can decide whether to show high bid or not

Fig. 10

© Copyright 2000, Bloomberg LP

312

312 (FP)

| Firm Profile | (LCt) | Non-Trading Partner | Perio | Links |

10:45:47 (LCt)

FIRM PROFILE
Firm: BETS

465 prsbig2 n223 Govt    FP — 327

User Classes
| Class Name | User Count |
|---|---|
| Firm Principal | 2 |
| Firm Manager | |
| Trader | |
| Back Office | |
| My Trader | |

Firm Defaults
Inter-firm trading allowed?   N
Firm limit on total offerings par amount:
                                    100,000,000
Firm limit on total bids par amount:
                                    100,000,000

Registration Information
Registration Clearance    Y
Tradebook Clearance       Y Contact Information
Name:    DIANA DING
E-Mail:  DDING1@BLOOMBERG.NET
Phone #  (609) 279-3269

Clearing Information
Clearing House Clearance   Y

Firm Administrators
1 Name:    DIANA DING
  E-Mail:
  Phone #
2 Name:
  E-Mail:
  Phone #

© Copyright 2000, Bloomberg LP

Fig. 14 prsblg1 n223 Corp  OFSU — 327

Please choose from the following:

1) Create a new staged offering list.

2) Join an existing staged offering list.

312 2  10:23:47 (LCL)

© Copyright 2000, Bloomberg LP

Fig. 19 prsblg1 n223 Corp  OFSU )—327

Please choose a name for the new staged offering list

SPEX
—
612

312 ᒣ
10:33:18 (LCL)

© Copyright 2000, Bloomberg LP

Offering staged — 312 prsblg2 n223 Corp  OFSU — 327

Add Like - 3 «GO»   Links   Panic

10:44:37  (LC1)

Offering entry for: IBM 6 ½ 01/15/28 — 351

Cusip: 459200AS0 } 356

Offering
Amount:            10MM              10,000,000     — 352, 376
Settlement Date:12/12/00– Standard
Benchmark:         30-Year Treasury
Price To:          Maturity 1/15/28@100.00
Indicative Benchmark P/Y: 110      /5.969       — 356

Pricing
Source   Bid/Ask          Time           — 364
BFV   Spread  +186.1/ +186.1  10:44
MLCM  Spread  +187.4/ +182.4  10:44
FCM   Spread  +181.4/ +159.4  10:44       — 365
Indicative Offer P/Y:  104.5/ 6.2

Auction
Reserve Spread:    +60    bps           — 354, 353
Auction Date:      12/ 7/00 Time 11:00ET
Show Reserve:      Y                    — 357
Intraday Auto Roll:N                    — 356

Outright Offering
Post Outright Spread:       bps         — 359

Optional
Personal Keywords                       — 361

Client Reference Number:
Post Live Offering: N    Live Offering   Bids Wanted: N
Post Live Spread:        N              bps Client reference no.                    — 360

Notes
                                        — 362

****Test (channel:6)****

© Copyright 2000, Bloomberg LP

```
┌─────────────────────────────────────────────────────────────┐
│  ┌─ Click on Any List to See the Details      prsblg1 p056 Corp SOLM ──327
│  │ ┌──────────────┐ ┌──────┐ ┌──────┐
│  │ │ Customized View │ │ Links │ │ Panic │
│  │ └──────────────┘ └──────┘ └──────┘
│  │
│  │ STAGED OFFERINGS LIST MANAGER           Page 1 / 2
│  │ Staged by: DIANA DING      UUID 454636   Start Date: 5/21/01
│  │ ┌──────────────────────────────────────────────────┐
│  │ │ Created  Created                  # of    Error  List
│  │ │ Date     Time (LOC)  List Name    Offerings Count Status
│  │ │
│  │ │ 1) Today  14:46:13   SPEX         1             Pending
│  │ │
│  │ │
│  │ │                              ─348
│  │ │
│  │ │ ******Test(Channel:6)******  BETS uuid:44720
│  │ │ © Copyright 2000, Bloomberg LP        Class: Adm Firm:BBPR
│  │ └──────────────────────────────────────────────────┘
312┘
└─────────────────────────────────────────────────────────────┘
```

| Selected Postings 1 | Next Action - 19 | Delete Mode - 99 <G | Panic |

Enter 'X' in front of each posting to be posted, click on a posting for detail.

prsbig1 p056 Corp SOLM ⎤ — 327

— 479

STAGED OFFERINGS LIST

Staged by: DIANA DING     UUID 454636     SPEX     Page 1/1

| Bid/Offer | Auction Time (Local) | Amount | Cur | Sec. | Desc. | BM | Res. Spread | Outr. Spread | Status |
|---|---|---|---|---|---|---|---|---|---|
| 1) O | 15:00 ET | 10MM | USD | IBM 6.5 | 01/15/28 | 30y | | +60 | Pend. |

480 —

****Test (Channel;6)*****     BETS uuid: 44720
© Copyright 2000, Bloomberg LP     Class: Adm Firm:BBPR

| | | | | | | | | prsbig3 p056 Corp OFVM — 327 |
|---|---|---|---|---|---|---|---|---|

| Standard View | Customized View | Links | Panic |
|---|---|---|---|

POSTINGS MONITOR
By Maturity

Page 1 / 2
Tradebook FI: 212-893-4880

| | | Security | | | | | Auction | Live | |
|---|---|---|---|---|---|---|---|---|---|
| | B/S | Amount Description | Sers | BM | | | Bid/Offer | Bid/Offer | Status |
| | | TODAY 15:00 | ET | NEXT | USD | Auction (15:00 LCL) | | | |
| 1) | S | 10M VIA 7-5/8 01/02 | TRBK | 2y M | | | / HR | / | Opn |
| 2) | B | 150M PEP 5-3/4 01/03 | TRBK | 2y M | | | / | 75 / | Opn |
| 3) | B | 400M PEP 5-3/4 01/03 | Trader A | 2y M | | | / | 80 / | Opn |
| | | TODAY 15:10 | ET | NEXT | USD | Auction (15:10 LCL) | | | |
| 4) | B | 100M PEP 5-3/4 01/03 | TRBK | 2y M | | | / | 79 / | Opn |
| 5) | S | 300M G 6-1/4 08/15/03 | TRBK | 2y M | | | / 100 | / 83 | Opn |
| 6) | S | 15MM BSC 7.8 08/15/07 | My Firm | 10y M | | | / | / 100 | Opn |
| 7) | S | 10MM KMB 9-1/2 01/08 | TRBK | 2y M | | | / 30 | / 40 | Opn |
| 8) | S | 25MM ED 7-1/2 00/01/10 | TRBK | 10y M | | | / 50 | / 123 | Opn |
| 9) | S | 10MM IBM 7-1/2 06/13 | TRBK | 30y M | | | 120 / | / | Opn |
| 10) | S | 100M IBM 7-1/2 06/13 | Mine | 10y M | | | / | / | Opn |

BETS uuid: 44720

*****Test (Channel:6) *****
© Copyright 2000, Bloomberg LP

Class: Adm Flrm:BBPR

Fig. 24

BID ENTRY

BSC 7.8 08/15/07
Auction Time: 12/7/00 10:30 EST
My Spread Bid is 120 bp

Cusip:073902BV9

Offering
Amount: 10,000
Settlement Date: 12/12/00 Standard
Yield to Maturity (.8/15/07@100.00)
Benchmark: 5 Year Treasury
T 5 ¾ 11/15/05
Rsv Sprd +100  H. Bid  N/A

Pricing

| Source | Bid/Ask | Time |
|---|---|---|
| BFV Spread | +219.2/+219.2 | 10:21 |
| FCM Spread | +210.9/+185.9 | 10:21 |
| SGFI Spread | +220.9/+220.7 | 10:21 |
| Benchmark Price | 101-31¼ Yield | 5.285 |
| My Bid Price | 112.782 Yield | 5.485 |

Optional
Client Reference #:
Personal Notes
Personal Keywords
Clearing Instructions © Copyright 2000, Bloomberg LP

Fig. 26

My Bid Was Successfully Entered

Bid Spread: +20 bp
Security: BSC 7.8 08/15/07
Bid Amount: 10,000
Bid Time: 10:22:25 EST

Choices

1) View All Offerings for the Security
2) View All Activities for the Security
3) View All My Bids
4) Cancel Correct My Bid
5) Cancel My Bid © Copyright 2000, Bloomberg LP

Fig. 27 prsbig1 n223 Corp OFRO ⟩—327

Enter 'X' in front of each offering for rollover

| (De) Select all on page-99 <GO> | Links | Panic |

OFFERINGS ROLLOVER     Page 1/ 2
"*": not available for rollover     Start Date: 12/6/00

| | Bid/ Offer | Orig Date | Amount | Cur | Security Description | | BM (yr) | Rsrv +1 Sprd -1 | Show Rsrv | Live +1 Sprd -1 | New SettDate |
|---|---|---|---|---|---|---|---|---|---|---|---|
| 1) | B | 12/6/00 | 5 MM | USD | IBM 7-1/2 | 06/15/13 | 10 | — | — | +433 | 12/7/01 |
| 2) | O | 12/6/00 | 5 MM | USD | LU 5-1/2 | 11/15/08 | 10 | — | — | +412 | 12/7/01 |
| *3) | B | 12/6/00 | 150 M | USD | PEP 5-3/4 | 01/02/03 | 02 | — | — | +67 | 12/7/01 |
| 4) | O | 12/6/00 | 5 MM | USD | LU 5-1/2 | 11/15/08 | 10 | +412 | Y | — | 12/7/01 |
| 5) | O | 12/6/00 | 10 MM | USD | IBM 7-1/2 | 06/15/13 | 30 | +60 | N | — | 12/7/01 |

*****Test(Channel:6)***** BETS uuid:44720     Class: Adm Firm:BBPR
© Copyright 2000, Bloomberg LP

Fig. 28

BLTR

| Filter E | | prsblg1 p056 Corp BLTR |
|---|---|---|

My
2 Op

| | | | | riced | |
|---|---|---|---|---|---|
| | | | | atus | |
| | | | | Opn | |
| | | | | Opn | |

OFFER Amount: 10,000,000 USD
Issue: IBM 6-1/2 01/15/28
Benchmark: T 6-1/4 05/15/30
Settlement Date: 5/24/01
Auction Reserve: +60 bp
Live Spread: N/A B/S Trading:
1) S  1) Cancel this Offering
2) B  2) Edit Reserve and/or Live Offering Parameters
      3) View the List of Bids Against this Offering
      4) Enter a Live Bid
      5) Enter a Bid for a Different Size or Benchmark
   Analytics:
      6) View all of the Historical Postings on this Security
      7) Run DES on your other Bloomberg Screen
      8) Run YAS on your other Bloomberg Screen Offering posted by Dian (uuid 454636)

\*\*\*\*\*\*\*Test(Channel:6)\*\*\*\*\*\*\*     BETS uuid:44720        Class: Adm Firm:BBPR
© Copyright 2000, Bloomberg LP

Fig. 31

BHIS -U927902      prsbig1 p056 Corp BHIS — 327
<TAB> to Enter.

| Type | Filtered by | Links | Panic |
|---|---|---|---|

RESPONSE HISTORY     Page 1/ 2
My Responses from 5/21/01     *not yet priced

| Bid/ Exp / Auction | | Security | BM | | |
|---|---|---|---|---|---|
| Offer Time (local) | Amount Cur | Description | (yr) | Sprd | Status |
| 1) B 15:00 ET (15:00) | 15MM USD | BSC 7.8 08/15/07 | 10 | 20 | Opn |
| 2) O 15:00 ET (15:00) | 5MM USD | CTP 7.43 08/25/03 | 2 | 131 | Cxl |
| 3) B 5/14/01 | 10MM USD | IBM 7-1/2 08/15/13 | 30 | 100 | Opn |
| 4) B 4/20/01 | 10MM USD | F 5.73 01/13/05 | 5 | 153 | Exp |
| 5) B 4/20/01 | 500M USD | JNJ 7-3/8 08/29/02 | QTR | 11 | Trd |
| 6) O 4/18/01 | 1.1MM USD | ONE 7-7/8 08/01/10 | 10 | 175 | Trd |
| 7) B 2/13/01 | 35MM USD | F 7.6 08/01/05 | 5 | 185 | TA |
| 8) O 1/13/01 | 350MM USD | TOS 7-1/4 01/01/07 | 10 | 20 | Opn |

\*\*\*\*\*\*\*Test (Channel: 6) \*\*\*\*\*\*\*    BETS uuid:44720
© Copyright 2000, Bloomberg LP      Class: Adm Firm:BBPR

Fig. 32

FOFH
<TAB> to Enter.                                                    prsbig1 p056 Corp FOFH ⟩—327

| Offering Type | Display Format | Links | Panic |

POSTING HISTORY                                                    Page 1/ 2
Firm Offerings from 5/14/01 to 5/21/01                             * not yet priced

| Bid/ Offer | Exp / Auction Time (local) | Name | Amount | Cur | Security Description | BM (yr) | Rsrv Sprd | Live Sprd | Status |
|---|---|---|---|---|---|---|---|---|---|
| 1) B | Today | DI | 100M | USD | PEP 5-3/4 01/02/03 | 2 | N/A | +80 | Opn |
| 2) B | Today | DI | 100M | USD | PEP 5-3/4 01/02/03 | 2 | N/A | +79 | Opn |
| 3) O | Today | DI | 10MM | USD | KMB 7-7/8 02/01/23 | 30 | +60 | +140 | Opn |
| 4) O | 15:00ET (15:00) | DI | 10MM | USD | IBM 7-1/2 06/15/13 | 30 | +60 | N/A | Opn |
| 5) O | 15:00ET (15:00) | DI | 10MM | USD | VIA 7-5/8 01/01/02 | 2 | +50 | N/A | Opn |

****Test (Channel:6) ******  BETS uuid:44720
© Copyright 2000, Bloomberg LP                                    Class: Adm Firm:BBPR

Fig. 33

MOFH ⟩—327  prsbig1 p056 Corp MOFH

| Filter/Sort By | Display Format | Links | Panic |

<TAB> to Enter.

POSTING HISTORY —472
My Postings from 5/41/01 to 5/21/01                                    Page 1/ 1
                                                                        * not yet priced

| Bid/ | Exp / Auction | Amount Cur | Security Description | BM (yr) | Sprd | Status |
|---|---|---|---|---|---|---|
| 1) B | 15:00 ET (15:00) | 15MM USD | BSC 7.8 08/15/07 | 10 | 20 | Opn |
| 2) O | 15:00 ET (15:00) | 5MM USD | CTP 7.43 08/25/03 | 2 | 131 | Cxl |
| 3) B | 5/14/01 | 10MM USD | IBM 7-1/2 05/15/13 | 30 | 100 | Opn |
| 4) B | 4/20/01 | 10MM USD | F 5.73 01/13/05 | 5 | 153 | Exp |
| 5) B | 4/20/01 | 500M USD | JNJ 7-3/8 05/29/02 | QTR | 11 | Trd |
| 6) O | 4/18/01 | 1.1MM USD | ONE 7-7/8 08/01/10 | 10 | 175 | Trd |
| 7) B | 2/13/01 | 35MM USD | F 7.6 08/01/05 | 5 | 185 | TA |
| 8) O | 1/13/01 | 350MM USD | TOS 7-1/4 01/01/07 | 10 | 20 | Opn |

****Test (Channel:6)****      BETS uuid:44720

© Copyright 2000, Bloomberg LP                              Class: Adm Firm:BBPR

Fig. 34

| | OFH | prsblg9 n223 Corp | OFH ⟩ 327 | | | |
|---|---|---|---|---|---|---|
| ⟨TAB⟩ to Enter. | | | | | | |
| Offering Type | Display Format | Limit | | | | |
| 18:28:27 (LCL) | | | | | | |

OFFERINGS HISTORY

Page 1/ 10
*not yet priced

All Offerings    From 11/30/00 to 12/ 7/00 Filter by keywords:

| | Auct. | Time | Amount | Cur | Security Description | BenMark | Outright | | Status |
|---|---|---|---|---|---|---|---|---|---|
| 1) | 12/ 7 | | 2MM | USD | EDS 7.45 10/15/29 | 300 | Y | 200bp | Traded |
| 2) | 12/ 7 | | 15M | USD | VIA 7 ⁵⁄₈ 01/01/02 | 20 | Y | 150bp | Cancelled |
| 3) | 12/ 7 | | 15M | USD | VIA 7 ⁵⁄₈ 01/01/02 | 20 | Y | 100bp | Open |
| 4) | 12/ 7 | 11:30 | 10MM | USD | IBM 6 ⁱ⁄₂ 01/15/28 | 300 | N | | Open |
| 5) | 12/ 7 | 10:30 | 10M | USD | WMT 6 ⁷⁄₈ 08/01/02 | 20 | N | | Open |
| 6) | 12/ 7 | 10:30 | 15M | USD | T 8 05/15/25 | 300 | N | | Open |
| 7) | 12/ 7 | 10:30 | 10M | USD | KMB 7 08/15/23 | 300 | N | | Open |
| 8) | 12/ 7 | 10:30 | 10M | USD | BSC 7.8 08/15/07 | 50 | N | | Open |
| 9) | 12/ 7 | 09:30 | 1MM | USD | IBM 7 ⁱ⁄₂ 06/15/13 | 100 | N | | Traded |
| 10) | 12/ 7 | 09:30 | 1MM | USD | EDS 7.45 10/15/29 | 300 | N | | Expired |
| 11) | 12/ 7 | 09:30 | 2MM | USD | EDS 7.45 10/15/29 | 300 | N | | Expired |
| 12) | 12/ 7 | 09:30 | 3MM | USD | EDS 7.45 10/15/29 | 300 | Y | 3000bp | Expired |
| 13) | 12/ 7 | 09:00 | 1M | USD | IBM 7 ⁱ⁄₂ 06/15/13 | 100 | N | | Cancelled |
| 14) | 12/ 6 | | 100M | USD | F 7.6 08/01/05 | 50 | Y | 1900bp | Traded |
| 15) | 12/ 6 | | 10M | USD | BUD 6 ³⁄₄ 08/01/03 | 20 | Y | 800bp | Expired |
| 16) | 12/ 6 | 22:00 | 25MM | USD | VIA 7 ⁵⁄₈ 11/01/23 | 300 | N | | Expired |
| 17) | 12/ 6 | 21:30 | 10M | USD | IBM 7 ⁱ⁄₂ 06/15/13 | 100 | N | | Expired |

© Copyright 2000, Bloomberg LP

Fig. 35

| | Time | B/S | Amount | Security | Price | Yield | Setdt | Status |
|---|---|---|---|---|---|---|---|---|
| 1) | 12/ 7 11:30 | Buy | 15MM | BSC 7.8 08/15/07 | 112.675 | 5.503 | 12/12/00 | Traded |
| 2) | 12/ 7 11:11 | Sell | 10MM | ONE 6.48 01/10/01 | 100.006 | 6.035 | 12/12/00 | Traded |
| 3) | 12/ 7 10:30 | Buy | 10M | BSC 7.8 08/15/07 | 112.675 | 5.503 | 12/12/00 | Traded |
| 4) | 12/ 5 16:36 | Buy | 250M | F 5.67 02/15/01 | 99.976 | 5.727 | 12/ 8/00 | Traded |
| 5) | 11/29 16:30 | Sell | 1M | IBM 7 ½ 06/15/13 | 117.180 | 5.576 | 12/ 4/00 | Traded |
| 6) | 11/29 16:04 | Sell | 1M | IBM 7 ½ 06/15/13 | 117.077 | 5.586 | 12/ 4/00 | Traded |
| 7) | 11/28 11:22 | Buy | 15M | IBM 5.4 12/01/08 | 95.613 | 6.101 | 12/ 1/00 | Traded |
| 8) | 11/16 11:00 | Buy | 4MM | WMT 6 ⅞ 08/01/02 | 95.704 | 9.672 | 11/21/00 | Traded |
| 9) | 11/14 17:05 | Sell | 10MM | EDS 7.45 10/15/29 | 104.820 | 7.056 | 11/17/00 | Traded |
| 10) | 11/ 8 18:48 | Sell | 1MM | VIA 8 ⅞ 06/01/01 | 101.334 | 6.357 | 11/13/00 | Traded |
| 11) | 11/ 8 16:33 | Sell | 1MM | CIT 6 05/08/01 | 99.806 | 6.407 | 11/13/00 | Traded |
| 12) | 10/26 16:01 | Buy | 100M | KMB 7 08/15/23 | 104.869 | 6.583 | 10/31/00 | Traded |
| 13) | 10/26 15:57 | Buy | 100M | EDS 7.45 10/15/29 | 109.103 | 6.731 | 10/31/00 | Traded |
| 14) | 10/24 17:05 | Buy | 1MM | EDS 7.45 10/15/29 | 109.460 | 6.705 | 10/27/00 | Traded |
| 15) | 10/24 16:00 | Buy | 1MM | EDS 7.45 10/15/29 | 109.554 | 6.698 | 10/27/00 | Traded |
| 16) | 10/18 14:30 | Sell | 10MM | ONE 6.35 03/19/01 | 100.148 | 5.941 | 10/23/00 | Traded |
| 17) | 10/18 14:00 | Buy | 900M | BSC 6 ¼ 07/15/05 | 98.472 | 6.629 | 10/23/00 | Traded |
| 18) | 10/18 13:22 | Buy | 10MM | CIT 6.7 02/15/01 | 100.037 | 6.496 | 10/23/00 | Traded |

Fig. 37

COMPUTER TRADING OF FINANCIAL INTERESTS

This application claims the benefit of U.S. provisional patent application Ser. No. 60/229,173, filed 30 Aug. 2000 and entitled Computerized Bond Auction.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent files or records, but otherwise reserves all copyrights whatsoever.

BACKGROUND OF THE INVENTION

The invention disclosed herein relates generally to computerized trading in financial interests, and in particular to computerized auctions and sales of financial interests, including stocks, options, futures, forwards contracts, commodities, and fixed income securities, including but not limited to corporate, government, and municipal bonds. The invention also relates to computer implementations of new or improved trading features, particularly useful in auction and non-auction transactions in financial interests using computer networks.

Electronic trading and electronic assisted trading of securities and other financial interests has been progressing for a number of years. Perhaps the greatest advances have been made in electronic stock trading systems. Other advances have been made in the trading of electricity forwards (see, e.g., co-pending U.S. application Ser. No. 09/584,045, titled "Electronic Trading System For Electricity Forwards, filed May 30, 2000, and Ser. No. 09/476,935, titled "System And Method For Implementing Foreign Exchange Currency Forwards, filed Dec. 30, 1999, both of which are assigned to the assignee of this application).

Bond trading was traditionally accomplished by individual brokers dealing with buyers and sellers by telephone and later also by facsimile. Recently electronic bond trading systems have become commercially available for use in the primary municipal bond market. One such system is the Bloomberg "Deal-O-Matic System" (see "Grant's Municipal Bond Issuer", Vol. 2, No. 14, Jul. 16, 1998). Prior to that, Bloomberg LP provided a system ("Municipal Bid Wanted" or MBW) for electronic assisted trading for secondary market municipal bonds and corporate bonds. That system is described in the article "What Corporate Traders Could Learn from Munis," published in "Bloomberg" Magazine, Sep. 16, 1993 at pages 16-17.

U.S. Pat. No. 5,915,209, titled "Bond Trading System" and issued to David Lawrence on Jun. 22, 1999, discloses a municipal bond trading system which conducts a private electronic auction of bid wanteds between a market maker and prospective bidders. Bid wanteds are distributed, or transmitted, to prospective bidders. It is believed that the system described in this patent has never been commercialized. A summary of existing electronic bond trading systems is contained in "eCommerce in the U.S., Fixed Income Markets", "The 1999 Review of Electronic Transaction Systems", The Bond Market Association, November, 1999. (Available from Bondmarkets.com's web site at www.bondmarkets.com.)

The invention disclosed herein continues the advance of electronic trading systems for financial interests, and introduces new or improved features useful in electronic trading.

SUMMARY OF THE INVENTION

The invention provides improved methods, systems, and apparatus for trading of financial interests, including municipal and other types of bonds. While the invention has application to the trading of all types of financial interests, it has particular application to the trading of fixed income securities, including various types of bonds, especially in the secondary market. Therefore, the description herein continues with, sometimes, reference to bonds with the understanding that that term applies to other financial interests as appropriate.

The invention provides methods, systems, and apparatus for improved trading of financial interests, including auction of bonds, via computer network. Improvements include disclosure of high bids and optionally of the identities of high bidders and/or offerors during the auction process; commingling or crossing of proposals for auction and non-auction transactions, and for commingling or crossing of auctions; presentation of reference benchmark prices and of price references derived using benchmark prices; enablement of the designation of reserve spreads, or minimum acceptable bids, to aid offerors and bidders in assessing proposals and ensuring that reasonable prices are paid for bonds; provisions for immediate rescission of offerings and/or bids for use, for example, in case of emergency; the use of time-limited passwords and passwords that enable or, by expiring, disable selected system functionality; assignment of user access level classes; keyword tagging or identification of offers or bids; bidder-initiated access to descriptions of bond offerings; tailored pushing or presentation of offers to prospective bidders; the use of multiple data sets and/or trading channels to enable separation of markets, for example for accounting and/or regulatory purposes, and to accommodate training and familiarization efforts; enabling the creation of data sets in outside programs and subsequent and optionally repeated uploading or importation of data to the auction system; and enabling the staging of proposed transactions for review by other system users. The invention includes methods and processes as well as suitable computer programs and data processing systems.

In one aspect, the invention provides a method of auctioning bonds or other financial interests. The method comprises enabling a plurality of possible bidders to access one and preferably more descriptions of a bond offering; enabling the making via the computer network of bids for the bond offering by the plurality of possible bidders; determining a highest received bid value for the bond offering from among bids entered by the plurality of possible bidders; enabling access via the computer network to the highest received bid value, especially by the plurality of bidders themselves so as to improve the efficiency and fairness of competition; and enabling acceptance via the computer network by an offeror of one of the bids received from the bidders. At the option of either the offeror and/or the bidder access is either provided or not provided to the identity of the bidder making the highest current bid, as well as to the value of the bid. At the option of the offeror, the offeror's identity is also disclosed.

In preferred embodiments of the invention, access to descriptions of proposed transactions in bonds or other financial interests, and the making of such proposals, is enabled by providing a database for storage of such descriptions on a central server such as a computer system and allowing users to access the system by connecting to the server via a network or other connection. In such ways descriptions of proposals may be provided to prospective counterparty traders, and responsive proposals from such traders may be accepted.

In one aspect, the invention offers improvements in the auctioning of financial interests through the consideration of straight, or "live," bids or offers as entries in the auctions. For example, a computer used in trading financial interests receives from a user, via a computer network, terms for a proposed auction in financial interests and associates with the proposed auction, either by assignment of a default value or by designation by the user entering the proposal, a deadline for deciding the proposed auction. The computer also receives terms for at least one proposed non-auction transaction in at least one of the financial interests or in a substantially or sufficiently similar interest, identifies the proposed non-auction transaction as an entry in the proposed auction, and optionally conducts the auction using the nonauction proposal as an entry.

Auctions in financial interests are also improved by crossing or commingling of separate auctions. For example, two separately-proposed auctions in one financial interest, one sell auction and one buy auction, assigned the same or sufficiently close deadlines, and each stating a reserve price and meeting the other's reserve price, are considered as entries in the other's auction. A variety of factors may be used as criteria in deciding whether one auction proposal may qualify as an entry in another auction. For example, one or more of proximity in time of auction deadline, identity of financial interests, quantity, and stated minimum price may be used. The auction deadline, for example, may be required to be identical or within some specified period such as 5 minutes or other fraction of an hour, several hours, a day, or several days or more.

Optionally, the auction process is improved and the value and potential return from the executed transaction are maximized for both the buyer and the seller by disclosing, in various combinations designed to protect the privacy of the offeror and bidders, the identity(ies) of the offerors and bidders and information related to the highest current bid, including the highest bid price.

The efficiency of trading processes is also improved, and the confidence of potential buyers and sellers bolstered, by providing with descriptions of proposed transactions reference value information not originated by the users making the proposals. For example, because of the lack of a formal, established bond market (e.g., an established exchange), it can be difficult for potential bidders to assess the value of a bond offering, particularly with respect to issues not frequently traded, such as some corporate bonds. To this end the disclosure, as part of the offering description, of the most current and relevant reference values, or benchmark prices, for similar bonds can be of significant value to potential bidders, particularly where the information is derived or received from a respected, neutral source such as a financial reporting agency. Preferably such information is compiled from a plurality of sources and provided with the offering description in a format which shows both the relevant financial data and the time and date of the information for each source. Optionally a trader considering responding to a proposal is allowed to select one or more sources of such reference values, as for example from a list or pool of such sources provided by a service provider who provides network and other resources for implementing and exploiting processes according to the invention.

Optionally the setting of a final price in completion of the sale of a bond offering or other proposed transaction is delayed by a preselected time period, preferably on the order of 15 minutes or less, in order to determine a final current and reliable benchmark value for use in fixing the final sale price of the offering. This is particularly useful where a selling price term associated with the proposed transaction price is established relative to the benchmark or reference price, as for example in terms of a spread.

The description of the proposed transaction shown to traders or other system users can include reserve information indicating a price spread, or range of prices (i.e., a minimum price), within which an offeror is willing to entertain responsive proposals. It is anticipated that proposed transactions will generally be made through brokers (including brokerage firms), as has occurred historically in the sale of bonds and other financial interests, and that brokers will continue to request that traders specify such a spread; but preferably methods according to the invention give the offeror (whether the offeror is considered to be the actual owner of the interest to be traded or the owner's agent or broker) the option of making that spread information available to potential traders, or keeping it confidential, and of stating a price in terms of spread based on yield or direct price. Optionally also an offeror is enabled to designate that an offering may be purchased outright at an indicated price, without waiting for auction or the necessity of competing with other bidders. Optionally, as stated above, the reserve price spread is expressed relative to a benchmark reference price such as a price, or average price, for a benchmark bond.

In other aspects the invention comprises methods for achieving further improvements in the security and efficiency of trading in financial interests.

One such improvement comprises eliciting from traders or other users of the system descriptions of classes of interests the users wish to consider for trading, comparing the class descriptions provided by the users to available descriptions of proposed transactions, and informing the users of proposals matching their descriptions. This can, for example, help traders in keeping informed of available transactions, and reduce time and energy required for traders to identify proposals they wish to respond to, and can reduce the time required to close transactions and obtain for traders the results they seek.

Another such improvement comprises enabling an accessor of a description of a proposed transaction to associate with that description a personal identifier, for example in the form of a keyword, class or group name, client identifier, or notation, and to use that identifier to classify the description of the proposal. For traders or others dealing with large numbers of sale transactions, for example, the ability to associate personally-assigned and/or firm-standard identifiers with individual offers or bids, or groups of offers or bids, can be very useful in maintaining efficiency and safeguarding investments. For example, a user can group bond offerings under the term "steel" so that entering the keyword "steel" will bring up the set of offerings tagged with that term. This feature can also be used in storing search strategies. For example, after conducting a search based, for example, on yields, the search strategy can be effectively stored under a keyword, e.g., "portfolio A". A subsequent search can be run without having to enter the search strategy by calling up "portfolio A." In preferred embodiments of the invention a server provides implied keywords based for example on assigned offering series, thus a user may also filter search results or offering or bid lists based on criteria already stored within the system. In preferred embodiments of the invention master keyword lists are provided for each of the keywords preselected by the service provider and/or entered by a particular user.

Another improvement comprises storing data for descriptions of proposed transactions in a plurality of data bases or other data sets, and maintaining those data sets as separate data records, in order to keep various groups of transactions and proposals separate from each other. This is useful, for example, in accommodating or otherwise improving or effecting training of new system operators and traders, or allowing traders to practice trading techniques. Separate data sets are also useful for separation of different markets, as for example in case of regulatory or accounting requirement. Preferably a user of a system providing separate data sets is apprised of the data set he or she is using by a notation on, for example, a screen at the computer terminal the user is working from. In general, the data sets are accessible by all users of the system, or by substantial numbers of users, and are useable with the full trading functionality provided by the trading system, whether the data is intended for use in actual trading or in practice or training. Preferably data is not transferable between data sets, particularly between training and active trading data sets, by users of the system.

Another improvement offered by the invention is the enablement of the immediate rescission or canceling of groups of proposed transactions, as for example in case of sudden emergency in rapidly changing economic conditions or where required for other reasons. For example, the defection or termination of an employee or agent who has had authority to buy or sell bonds can give rise to a need for immediate cancellation of all of offers, bids, or other transactions that agent has pending; or breaking news may indicate the wisdom of rapidly reassessing a trader's commitments in the market. In preferred embodiments of the invention, this capability is provided through the use of a single command input, which may comprise a small number of discrete command steps, such as the entry of a single command or the selection of a single item on an interface screen, such as a "panic button" icon or input field, followed by a simple designation of a set of transactions to be canceled, and optionally a confirmation entered by the user making the rescission. Preferably the rescission is accomplished through a very small number of computer command steps which can be enacted or invoked very rapidly.

Another improvement is the entry and optionally storage of data sets corresponding to terms for pluralities of proposed transactions, the terms formatted as sets for use by the trading system through the use of other computer programs or processes, and optionally the subsequent batch handling or processing of such data sets. It is often convenient for those proposing financial transactions-to create descriptions of their proposals through the use of commercially-available applications such as data base or spread sheets programs, word processors, or the like, and to import or upload data sets created with such programs into systems created to implement the invention herein. This can facilitate, for example, user record keeping or data manipulation while maintaining an ability to rapidly and reliably handle or transfer data related to offers or bids. It is especially useful where large amounts of data must be repeatedly entered in the system.

Systems according to the invention preferably also facilitate the rollover of proposed transactions into subsequent trading periods. Bond auctions and other proposed transactions in financial interests are frequently conducted only over relatively short periods of times, as for example a few days, hours, or even minutes, and it sometimes happens that an offering, bid request, or other solicitation is not met by an acceptable response within the allotted time. In such cases the proposing trader sometimes wishes to roll the proposal over into a second offering with few or no changes to the data in the proposal description. This can be especially simple where the system user is enabled to maintain a description of his or her offerings in his own data processing system or in dedicated storage on the system server, optionally using programs with which the user is familiar, and to easily and repeatedly import or upload the description or description set into the transaction system. While preferred systems according to the invention facilitate the rapid, simple, and efficient "rolling over" of proposals, sometimes proposals are renewed after a substantial period of time, when the offering descriptions are no longer available within the trading system, but may yet be stored in user's own system. The use of upload features such as those disclosed herein can reduce the time and resource expenditure required for renewing or modifying and renewing such proposals offers.

The rollover provisions provided by the system are also considered an inventive contribution of the systems, processes, and apparatus disclosed herein.

Other improvements, particularly useful for improving the security of the trading system and of the investors who use it, are introduced in passwords and in providing selectable, multiple-level functional authorization for individual users and classes of users by, for example, administrative or managerial users.

The use of passwords to maintain the security of computer systems is not new. However, in the highly risky and rapidly changing world of computerized financial transactions, the use of a single password, valid permanently and providing full, unlimited functional access to the trading system for an indefinite time period following entry, is not always advantageous. For example, it sometimes happens that a user will log onto a secure system, work for a while, and then leave his or her terminal. If the terminal is left in a fully functional, logged-on state, the system is open for use by anyone who sits down at the terminal, and such individual could potentially commit the user or his firm to substantial, unwanted monetary commitments. The potential for harm resulting from such circumstances can be eliminated or reduced by assigning to each user a password which permits him or her access to the system, or to certain functions on the system, only for a limited period of time.

The invention provides such time-limited passwords. In a preferred embodiment, the invention provides the use of a password assigned to a user by an administrator, and the administrator is enabled to select a time period for which the password is valid, as for example for a selected period of minutes or hours, or for a defined number of transactions. After the expiration of the time period for which the password is valid the user is prevented from performing password-protected functions until he or she successfully re-enters the password, optionally at the prompting of the computer. Preferably also the system administrator may periodically change the length of time for which the password is valid. Alternatively, the password must be renewed by the user's supervisor or other administrator. Optionally either the administrator or the system operator are enabled to select the level of functionality available to the user through use of the password.

For example, in a system in which both order-executing commands, which are commands the entry of which may potentially bind the user to a proposed transaction, and non-order-executing commands such as commands for reviewing lists or details of proposed transactions, a user's authority to enter order-executing commands and optionally some non-order-executing commands is disabled upon expiration of the time period associated with the user's password. When the user attempts to enter an order-executing command following expiration of the time period, execution of the command is suspended and the user is prompted to re-enter his or her password before full functionality is restored and the command is executed.

The invention provides further protection by enabling a system administrator to assign to a user, or to a class of users, a level of authorized functionality on the system which may permit or prohibit the user(s) from performing various of the functions available on the system, or to set limits for the number of times such functions may be performed, or monetary limits for commitments the user can make. For example, the administrator may authorize a user or a class of users to buy, to sell, or both; and may limit the number or size of transactions the user or class is permitted to perform within a given time period. The user or class may be assigned monetary limits for trading, so that the user or class is not permitted to overextend himself, herself, or his or her firm. Preferred embodiments of the invention provide a number of default user classes available to the administrator, each class having one or more default attributes changeable by the administrator. In addition, the administrator is enabled to override class attributes or defaults and assign individual class members attributes at variance from the class standard; and to create new user classes. The assignment of various levels of functional access to the system can be particularly powerful when implemented in conjunction with the use of passwords as described herein. Administrators enabled to make such authorizations include both administrators of the server system and user administrators. In the latter case, the administrators may authorize activities or privileges of sub-users.

The invention further provides for review of proposed transactions by users other than the users making the proposals prior to their being placed in the market, such as for example by supervisors or administrators of the user entering the proposal. A server linked to a plurality of client systems via a computer network receives from a first user of a client system, for example a junior trader in a financial trading firm, terms for a proposed transaction in financial interests. The system further stores these terms, preferably within a central data store accessible by the first user and by other users as well. The system further authorizes, based on designations made by the first user, or by administrators on behalf of the first user, access to the terms by a second user, who is optionally an administrator or supervisor of the first user. The second user is enabled to review and optionally approve, cancel, or revise the terms of the proposed transaction, and the system receives from the second user an approval, cancellation, or revision(s), as appropriate.

Another improvement offered by the invention is the storage of information or other data created by or associated with individual users in data stores accessible by multiple users, as for example on or in association with (e.g., under the control of) the server hosting the programming which provides the trading functionality. Although the data is stored or controlled centrally, as it were, it is accessible only by the user(s) who created it, or with whom it is associated, or by the designees of such users. For example, segregated data sets for training or system practice; keyword tags; push descriptions; class or user functionality enablement data; and data related to staged proposals are all stored at or under the control of the server, and are accessible only to limited sets of users.

In other aspects the invention provides both data processing systems and computer program products, including computer useable media having embedded computer readable code devices configured for implementation of method aspects of the invention, and to otherwise effect the objects thereof, and means for accomplishing the objects disclosed herein.

BRIEF DESCRIPTION OF THE DRAWINGS

The invention is illustrated in the figures of the accompanying drawings which are meant to be exemplary and not limiting, in which like references are intended to refer to like or corresponding parts.

FIGS. 3-38 are schematic diagrams of representative interface screen displays from computer-implemented preferred embodiments of the invention.

DETAILED DESCRIPTION OF THE PREFERRED EMBODIMENTS

Preferred embodiments of the methods, systems, and apparatus of the invention are described through reference to the Figures.

Figure 1:
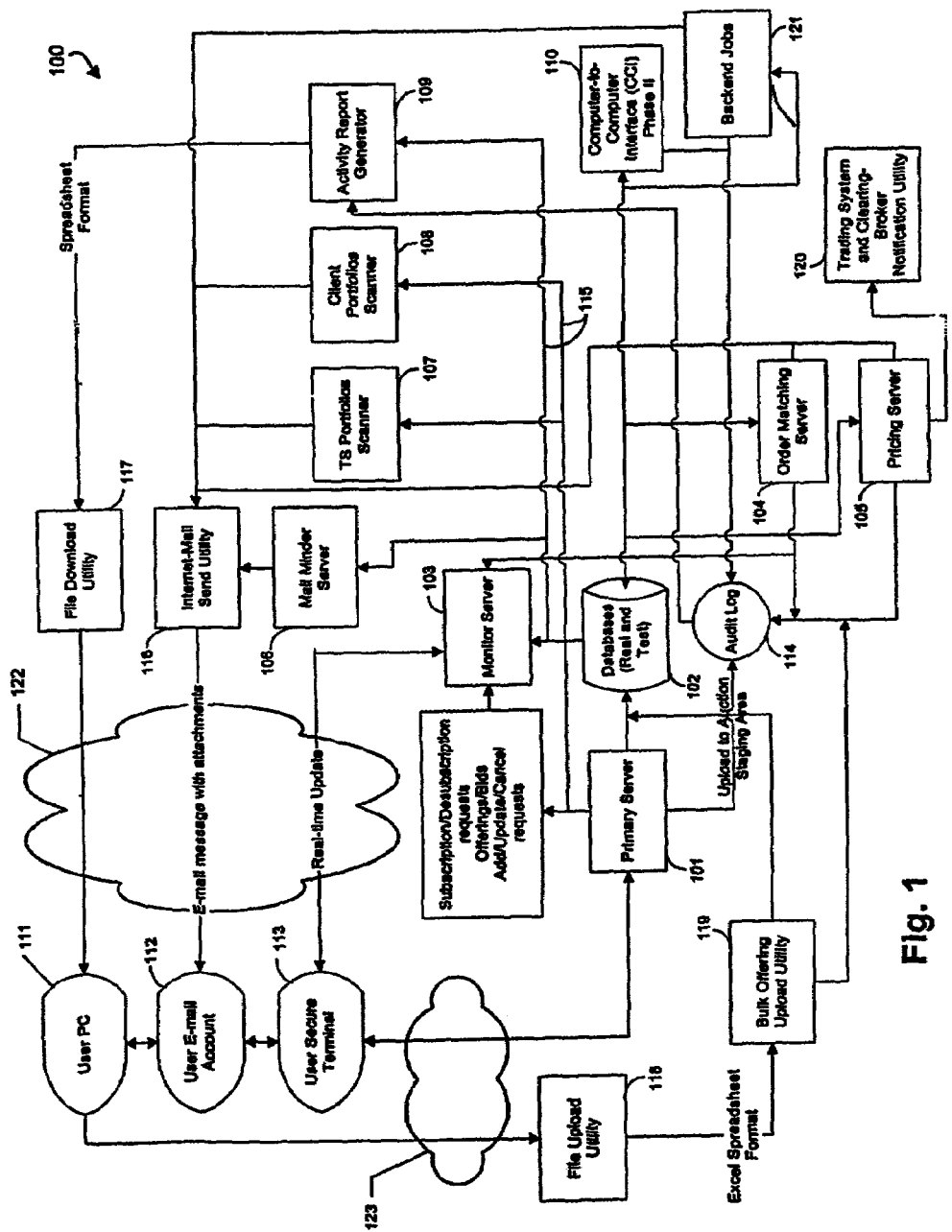
FIG. 1 is an information flow diagram for a preferred embodiment of a system for conducting bond auctions according to the invention.

An information flow diagram for a system for conducting bond auctions according to the invention and well adapted to the conducting of bond auctions via public or private computer networks is shown in FIG. 1. System 100 comprises primary server 101, data bases 102, monitor server 103, order matching server 104, pricing server 105, mail minder server 106, trading systems portfolio scanner 107, client portfolio scanner 108, activity report generator 109, computer-to-computer interface 110, user components 111, 112, and 113, and other components. As will appear immediately to those of ordinary skill in the design of such systems, the various components shown in FIG. 1 may comprise either distinct pieces of hardware or software routines, or separate circuits or components of a single piece of hardware such as a digital computer system, or combinations of separate or combined circuits or circuit elements and/or software routines. Moreover, many of the components are optional. In applications in which high volumes of data and/or numerous transactions are expected to be received or handled, it is advantageous to provide one or more separate computers for each of the servers and optionally other components shown in the Figure. This can substantially increase processing speed and reduce system delays, ensuring the most efficient and timely processing possible. This is especially beneficial where large monetary transactions in rapidly changing market conditions are concerned, as relatively small delays in time can result in relatively large changes in prices and therefor profits or losses for users.

Functions performed by primary server 101 comprise acting as the primary user interface for the system and thereby enabling access by users to descriptions of bond offerings, reception of bids, etc. For example, primary server 101 is responsible for controlling execution of all system functions and thereby enables the system to provide bond lot descriptions and access to bid entry forms to users such as offerors and actual or potential bidders. Accordingly primary server 101 is directly or indirectly communicatively linked to, for example, user personal computer (PC) 111, user e-mail account 112, user terminal 113 (preferably to pluralities of each), system data bases 102, monitor server 103, order matching server 104, pricing server 105, mail minder server 106, trading systems portfolio scanner 107, client portfolio scanner 108, activity report generator 109, computer-to-computer interface 110, and all other components in the system.

Primary server 101 and all other data processing apparatus and components described herein may comprise any suitable computer or data processing system. The Data General Corporation produces several Unix-based machines which serve satisfactorily, but many other computers, including most pentium-based desktop or laptop models, will serve also. For purposes of this disclosure the term computer denotes any data processing system, preferably automatic, suitable for implementation of the methods and processes disclosed herein.

System data bases comprise the primary data storage facilities for the system. Preferably they are secure and physically protected systems, and are capable of storing relatively large amounts of data reliably, and of being rapidly searched and facilitating rapid data storage and retrieval—so as to facilitate, for example, enabling access by users to information stored in the data base, and to enable the system to provide such information to users. Data bases 102 receive and hold data related to, for example, bids, sales, offers, benchmarks, identities and privileges of user and classes of users, and completed transactions, for use in response to queries from, for example, system users and various system components, and for further processing by primary server 101, monitor server 103, audit log 114, data lines or data busses 115, and other components as needed. In preferred embodiments of the invention multiple databases are provided, as herein described, to facilitate testing, training, and trading, and/or for special functions such as maintaining trader/user information, trade records, etc. In such embodiments a specific transaction, including offer, bid, and acceptance, is recorded and completed in a subset of one or more databases 102.

Monitor server 103 provides event-driven services such as on-going monitoring functions, thereby releasing other system components to respond to user-driven inputs and requests in the most timely and efficient manner possible. For example, when a user has provided the system with a description of bonds he or she wishes to purchase, monitor server 103 reviews data bases 102 on an ongoing basis for offerings, including newly-posted offerings, and informs the user of offerings of potential interest to the user, for example through e-mail sent by mail minder server 106. Likewise, when an offeror wishes to be informed that a bid has been received or a new high bid has been established, he can instruct monitor server 103 to watch bid postings and inform him as bids are received.

Order matching server 104 serves such functions as the matching of offers and bids at designated auction times. For example, in a preferred embodiment order matching server 104 continuously monitors data bases 102 and the system clock for current auction offers and, at the time designated for a given auction, searches data bases 102 for associated bids. Matching offer and bid information is immediately reported to primary server 101 and stored in data bases 102 for further processing. Again, use of a dedicated order matching server serves to increase the timeliness and efficiency of completion of auctions.

Upon establishment of matching bids and offers at auction time by order matching server 104, pricing server 105 is instructed to establish a firm and final benchmark price, and fix a final definite purchase price, which is reported to primary server 101 and any appropriate data bases 102. As described herein, in preferred auctions of the type with which the invention is concerned offers and bids are entered in terms of spreads based on relatively liquid benchmark securities, for which reasonably definite values can be determined. In some embodiments of the invention pricing server 105 waits for a predetermined delay period, preferably on the order of several minutes, and particularly about 15 minutes, before establishing and reporting a firm benchmark value and final price based thereon.

Mail minder server 106 effectuates notification of various users of a wide variety of events, including for example the confirmation of entry and acceptance of bids and offers and the posting of bids and offers of potential interest to the user. Mail server 106 optionally interacts with Internet-mail send utility 116 in notifying users at their e-mail accounts 112.

Portfolio scanners 107 and 108 accumulate information gathered, for example, by monitor server 103 for future communication to the server, as for example through the user's e-mail account 112.

Activity report generator 109 accumulates information related to completed trades and other activities, formats the information in predetermined and optionally user customizable format such as those used by commercially-available data base or spreadsheet programs, and forwards the information to the user, preferably through a file download utility 117.

User interfaces comprise PC 111, user e-mail account 112, and user terminal 113. User terminal 113 is preferably a secure terminal, to help ensure the security of potentially highly valuable, private, and time-critical data in data bases 102, and proprietary processes for facilitating auctions according to the invention. In preferred embodiments of the invention terminal 113 is either a dedicated, hard-wired terminal or is connected through customized software through a secure modem or network connection. User PC 111 and e-mail account 112 are of any suitable form, including common desktop models, "dumb" terminals, and Internet e-mail accounts. Though only one is shown in FIG. 1, in preferred embodiments of the invention the use of a plurality of each of the various types of user interface is permitted.

As previously discussed, systems, apparatus, and methods according to the invention are well suited to use with any computer networks, public or private. Such networks include, for example and without limitation, the Internet, local or wide-area networks, and secure electronic computer networks (ECNs) such as the BLOOMBERG PROFESSIONAL® and/or SPEX™ systems. For example, any of the various system components, such as user components 111, 112, and 113, may be co-located or combined, with each other and/or with other system components, into one or more discrete hardware, firmware, and/or software sets, or they may comprise physically distinct elements connected by one or more networks. For example, user elements 111, 112, and 113 may be connected to other system elements via communications links 122, 123, which may comprise networks, dedicated connections, or any other suitable communications means.

One preferred method for entry by a user information relating to a proposed transaction, such as for example an offer, bid, or bid wanted, and other information, to a system according to the invention is by interactive entry or communication to primary server 101 via user terminal 113, as herein described. Another preferred method is to upload relatively large amounts or batches of data created outside the system, as for example on user PC 111 by means of commercially-available data base and spreadsheet programs, to primary server 101 and/or data bases 102 via file upload utility and bulk offering upload utility 119. Yet another method, most often applicable and generally most advantageous in cases of interfacing between large or relatively highly sophisticated financial services entities, is a direct computer-to-computer interface 110. Such an interface facilitates direct and rapid communication of data, and particularly large amounts of data, through lower-level or more basic computer language programs and formatting that is typically used in the creation and communication of data by personal computers.

Additional utilities comprise trading system and clearing-broker notification utility 120, which facilitates communications with brokers responsible for completing and clearing completed auction trades, and backend jobs server 121. Backend jobs server 121 provides, for example, general system clean-up, maintenance, and administrative functions. For example, on a daily, weekly, or other suitable and preferably regular basis backend server 121 backs up needed data in data bases 102, deletes redundant, outdated, or otherwise unnecessary information or other data, and coordinates functioning of the various data bases. Likewise, where test or training data sets or channels are provided, as herein described, user information may periodically be copied from one data set to the other, so that a user wishing to use a new training program or facility is spared the effort of repeating the entry of inconvenient amounts of data.

Figure 2:
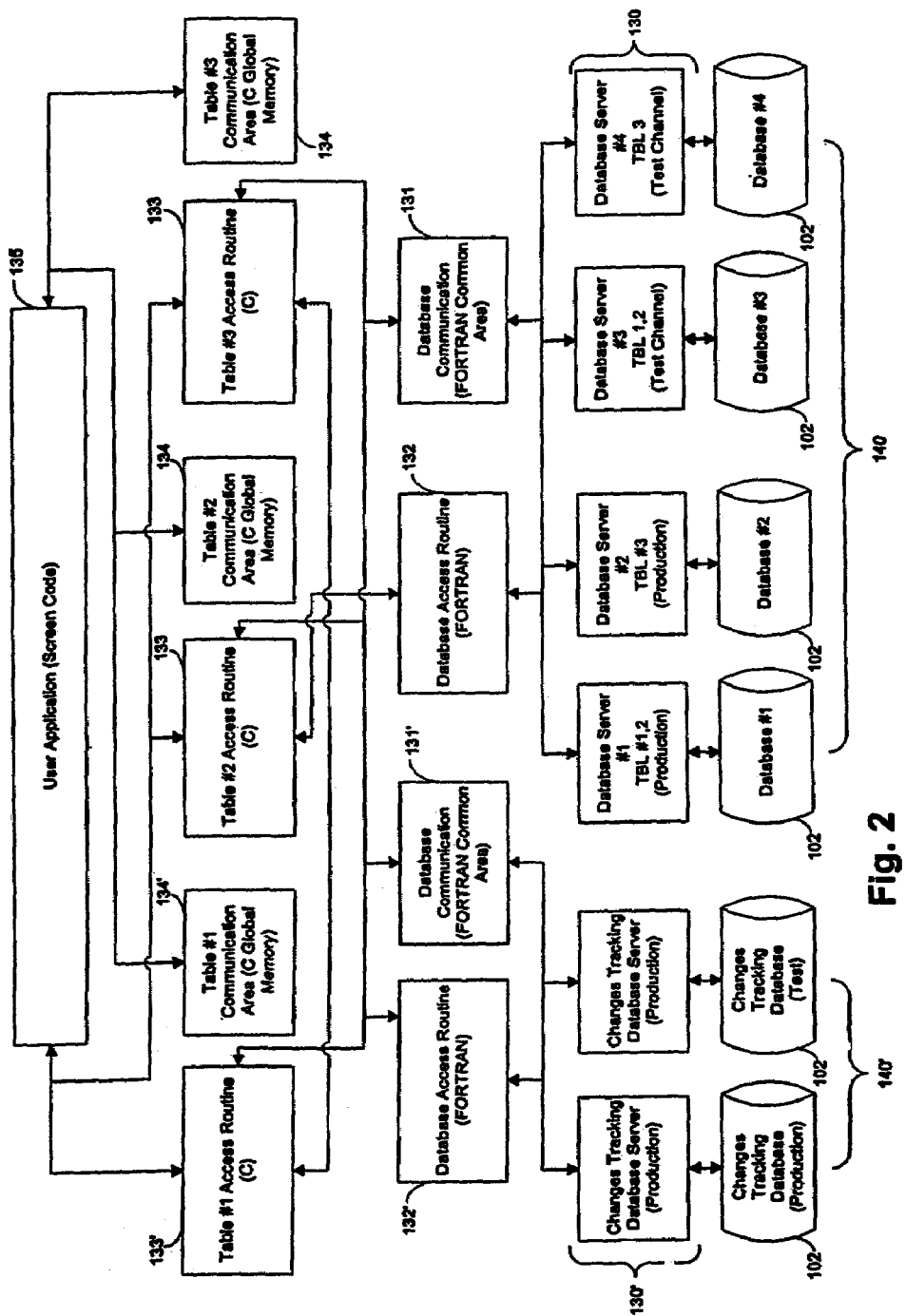
FIG. 2 is a schematic diagram of a program structure of a preferred embodiment of a system for conducting auctions according to the invention.
Figure 3:
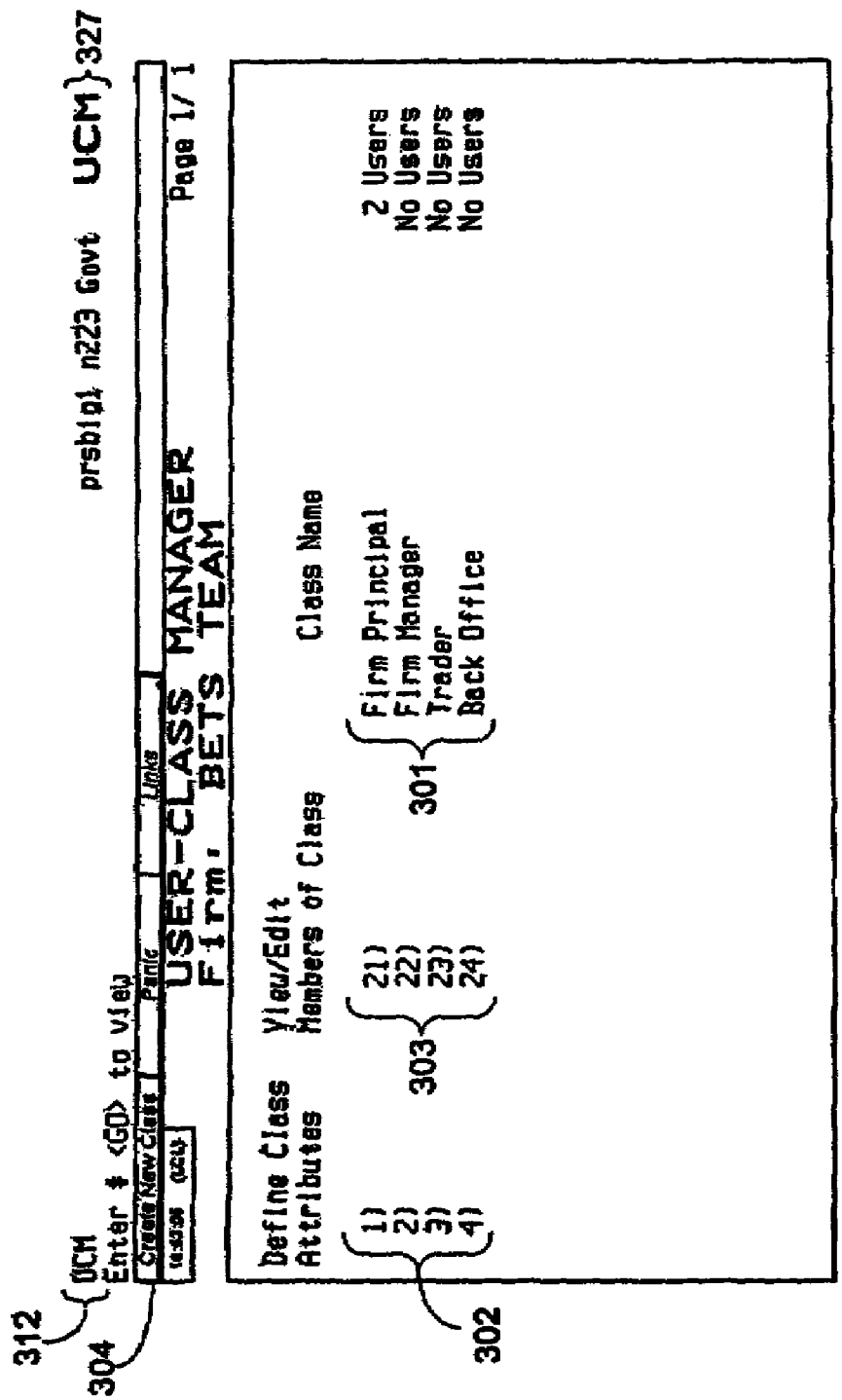
Figure 4:
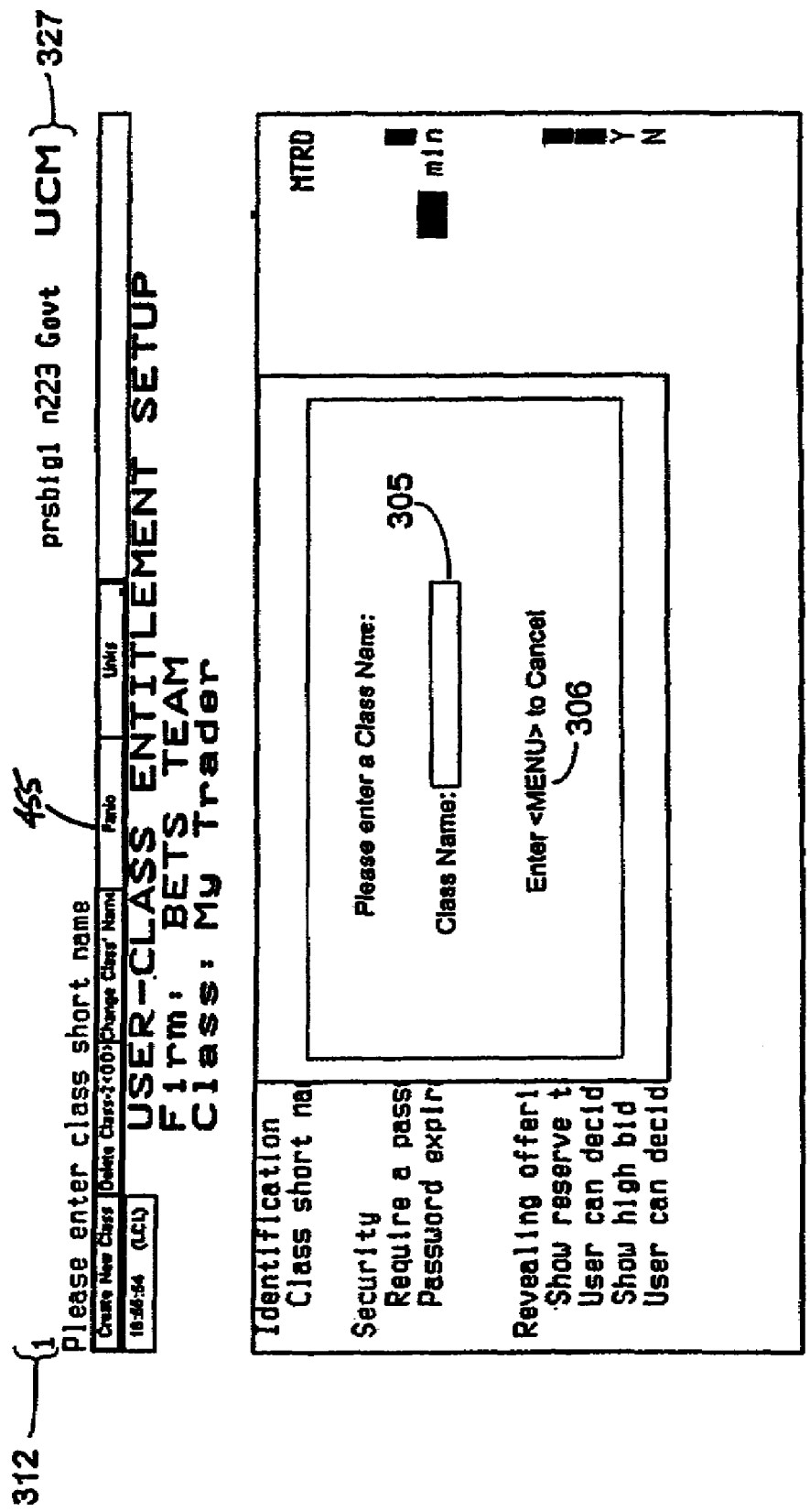

FIG. 2 is a schematic diagram of a program structure of a preferred embodiment of a system for conducting auctions according to the invention. System data bases 102 are divided into two sets, a set of one or more data bases 140 for actual trading, or for "production" use, and one or more data bases 140' for test, training, or practice use. Data bases 140, 140' are served by servers 130 and 130', respectively, which in turn are driven by data base access routines 132 and 132', which are written in the FORTRAN programming language. Data base access routines 132 and 132' direct servers 130 and 130' respectively in the rapid and efficient access of data stored in data bases 102. All other programming, comprising coding of instructions to carry out the various functions and communications described herein, is coded in the C programming language, including data base communication routines 130, 131', access routines 133, 133': communications tables 134 and 134'; user application 135, which provides most of the upper level data processing, computation; and user interface communications used, for example, by monitor server 103 of FIG. 1 for communicating with user terminal or terminals 111. As will occur to those of ordinary skill in the art of programming such systems, a great many programming structures, operating systems, and languages are suitable for encoding and implementing the processes and systems disclosed herein. The selection and creation of appropriate programs and structures will be well within the abilities of such designers, once they have been made familiar with this disclosure. Moreover, communications between programs and program elements may be made by direct, dedicated connection, or by any other suitable form of communications. For example, user application 135 may communicate with tables 133, 133', 134, 134', etc. via the Internet, private ECNs, or any other suitable communications links as represented by links 122, 123 of FIG. 1.

The methods, systems, and apparatus of the invention are further illustrated by reference to FIGS. 3-38, which represent screen displays of a computer-implemented preferred embodiment of the invention, and in the Appendix. The system comprises software adapted for the acceptance and communication of input and output data, especially by means of interactive screens, and for communication by other means such as e-mail and manual telephone communication, as well as suitable computer and network hardware. Suitable systems and apparatus include those shown, for example, in FIGS. 1 and 2. For example, presentation and creation of such screens, and input and output of data to and from users, is conveniently and efficiently accomplished and controlled by an application such as user application 135 of FIG. 2, implemented using monitor server 103 and presented on user systems 111, 112, and 113, and the like, of FIG. 1.

Interactive entry of offers and bids, and completion of other transactions and administrative tasks, is accommodated through the use of various system commands, preferably entered via a keyboard or other interface device such as a mouse as described herein. In general, each command is associated with a series of one or more interface screens adapted to elicit further input from or communicate further information to the user. Examples of such screens and commands are described below and in the Figures.

In describing a trading system according to the invention, it is useful to refer to various classes of system users. In general, users may be classed or described as "offerors" or "sellers," and "bidders" or "buyers," or sometimes through such accounting or oversight capacities as bookkeepers or accountants. It should be noted, however, that a single user may act in several of these (or other) capacities, or all of them, as for example as both offeror and bidder simultaneously, attempting to sell one or more sets of bonds while bidding on or buying others. It should also be noted that users referred to herein as "offerors," "sellers," "bidders," "buyers," or in other capacities include and can refer to both principals and agents, such as for example brokers or brokers' agents and employees. Terms such as "offeror," "bidder," "seller," and "buyer" are used only in their functional sense vis a vis the systems or functions herein described, and no particular legal or financial meanings or relationships are intended except as herein otherwise indicated.

EXAMPLE

As discussed, an advantageous manner in which to implement the invention is for a financial services provider to provide computers and suitable hardware, software and data bases, etc., implementing the methods and processes described herein on a host computer, accessible by users via number of remote terminals, as for example by means of wide- or local-area networks or by combinations thereof, preferably private or otherwise secure. The terminals are used by client offerors and bidders, often in the name or on behalf of bond brokerage firms known to the host or services provider and provided with appropriate instructions and security, to access the system and to make and accept offers and bids as herein described via a network. A commercially-available example of such a system is Bloomberg, L.P.'s SPEX™ bond trading system. The SPEX™ system is accessible through a private ECN.

Registering and Identifying Users and User Privileges

A first step in implementing such processes and accommodating trading of bonds or other financial instruments in such cases is to register users so that they are properly identified to the system and the system provider, and may be held accountable for trading actions, and properly served, while using system. An administrator of the service provider which provides the system via the network receives an application from a prospective trader. Assuming that the applicant meets all administrative requirements of the service provider, including for example any applicable regulatory requirements or proof of appropriate financial stability, the service provider enters into the system information identifying one or more principals of the applicant who will be responsible and directly accountable for each of the applicant's actions on the system. In the type of system described for this embodiment, it is anticipated that most of the applicants will represent financial or bond trading firms, and that the principals of such firms will be identified in the system as a class titled "firm principals," who serve as the primary firm administrators.

A registered firm is provided with a default of three additional classes of firm users for the system: managers, traders, and "back office" or accounting or book keeping staff. Firm administrators, who can include not only principals but their designees in other classes, are enabled to set up user accounts or user identifications, including passwords, for their managers, traders, and office staff, each class and optionally each member of the class being accorded varying privileges on the system. Each user class and each individual user i.d. is provided by the system with an attribute set specifying these privileges; firm principals and, at the principals' option, their designees are permitted to change the privileges.

A firm principal or administrator who has been given access to the system adds additional firm users by entering a command "UCM" at a system command line usually presented on a system screen such as an entry or starting screen (not shown). This results in the presentation of the screen shown in FIG. 3, the "User-Class Manager" screen. In the screen shown in FIG. 3 the user is prompted to either to add or edit members of one of the four classes 301 shown under the rubric "Class Name", or to modify or define default attributes for the classes 301 themselves, or to create an entirely new class. To modify or define default attributes for a class, the appropriate item 302 is selected by typing the associated number 1)-4) from the keyboard or optionally by selecting the appropriate item or item number with an interface controller such as a mouse. To review or edit attributes for individual class members, the appropriate selection is made from item group 303.

In general, privileges, or sets of attributes or authorizations assigned to user classes or to individual users may not exceed privileges set for the firm by the administrator of the trading system. That is, individual classes or users are generally enabled to perform functions or to bind the firm only to as great an extent as the firm's authorizations permit.

Generally, the current command function is shown for the convenience of the user in field 327.

Each of these operations will be demonstrated through creation of a new user class 301. To create a new user class the authorized administrator selects the "Create New Class" item 304. This results in presentation of the pop-up screen shown in FIG. 4. First the administrator is prompted to enter at location 305 a name for the new class.

If the screen has been reached in error, the administrator may enter a "menu" command, for example through the use of special keyboard combinations, selection of item 306 with the interface controller, or preferably through the use of a dedicated keyboard button labeled "menu," to back-track or proceed to any suitable intended function.

If the screen has not been reached in error, the administrator enters a name for the new class at 305. Entry of a new class name "my trader" results in presentation of the screen of FIG. 5.

Figure 5:
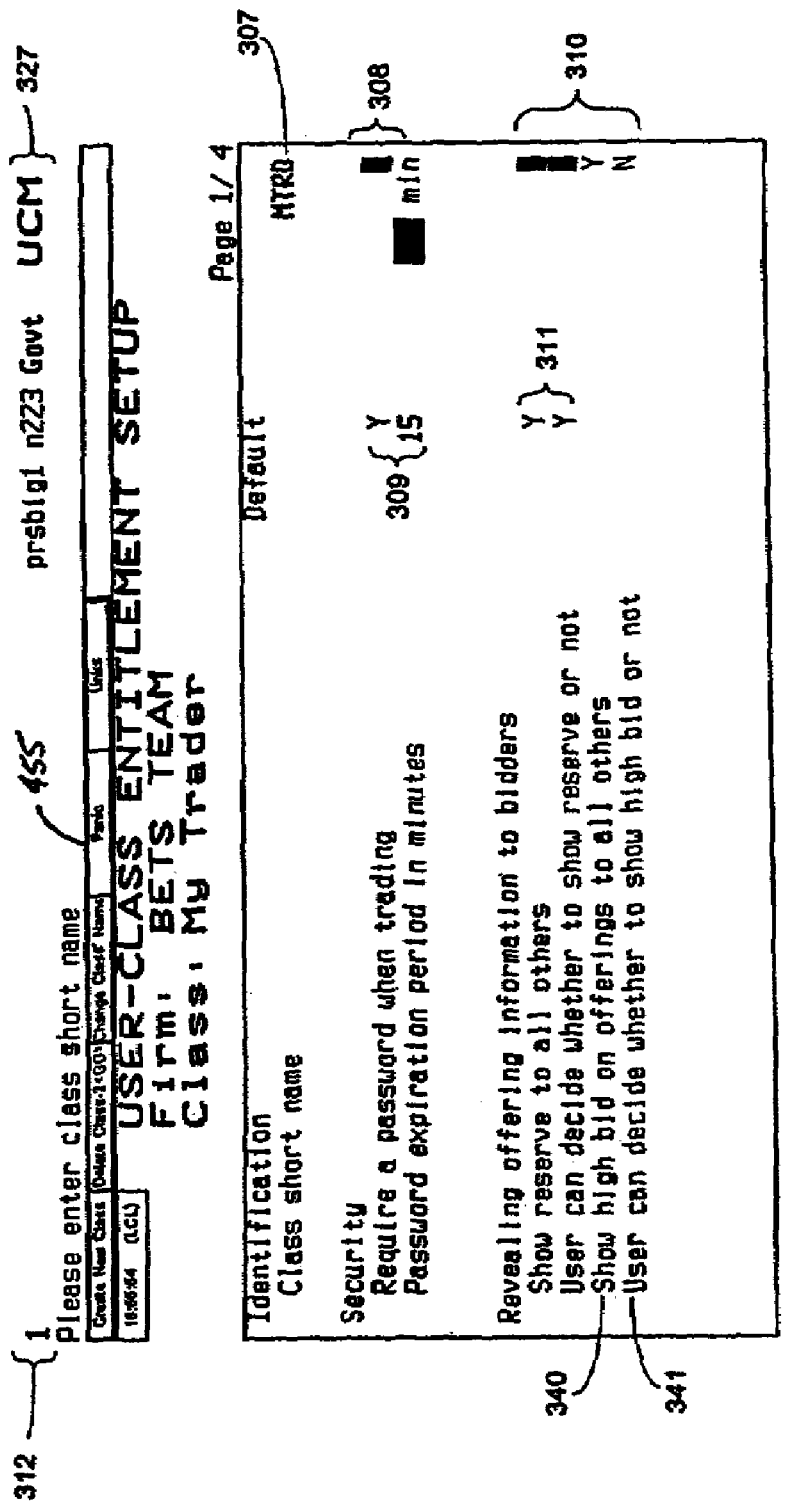
Figure 6:
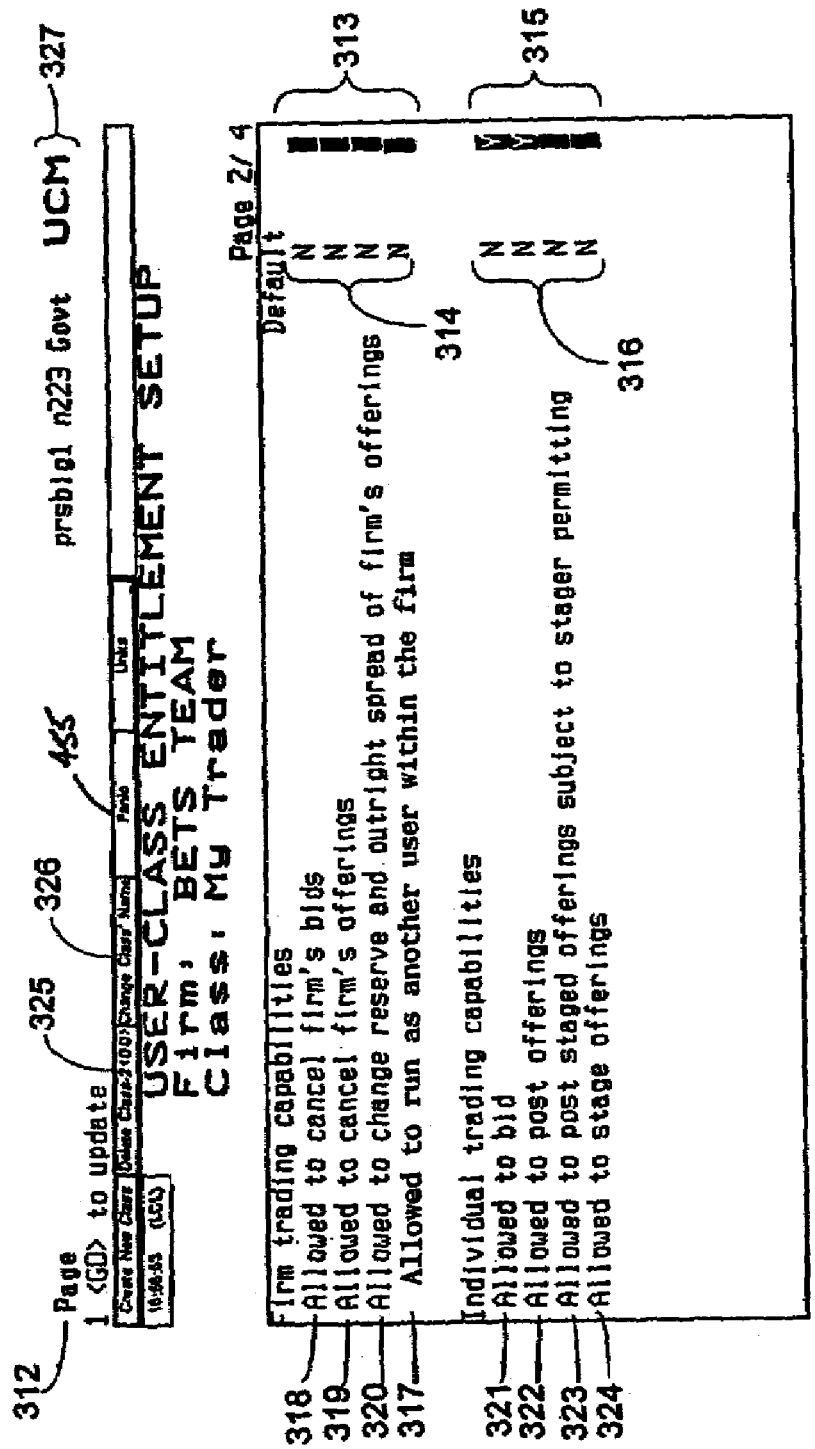
Figure 8:
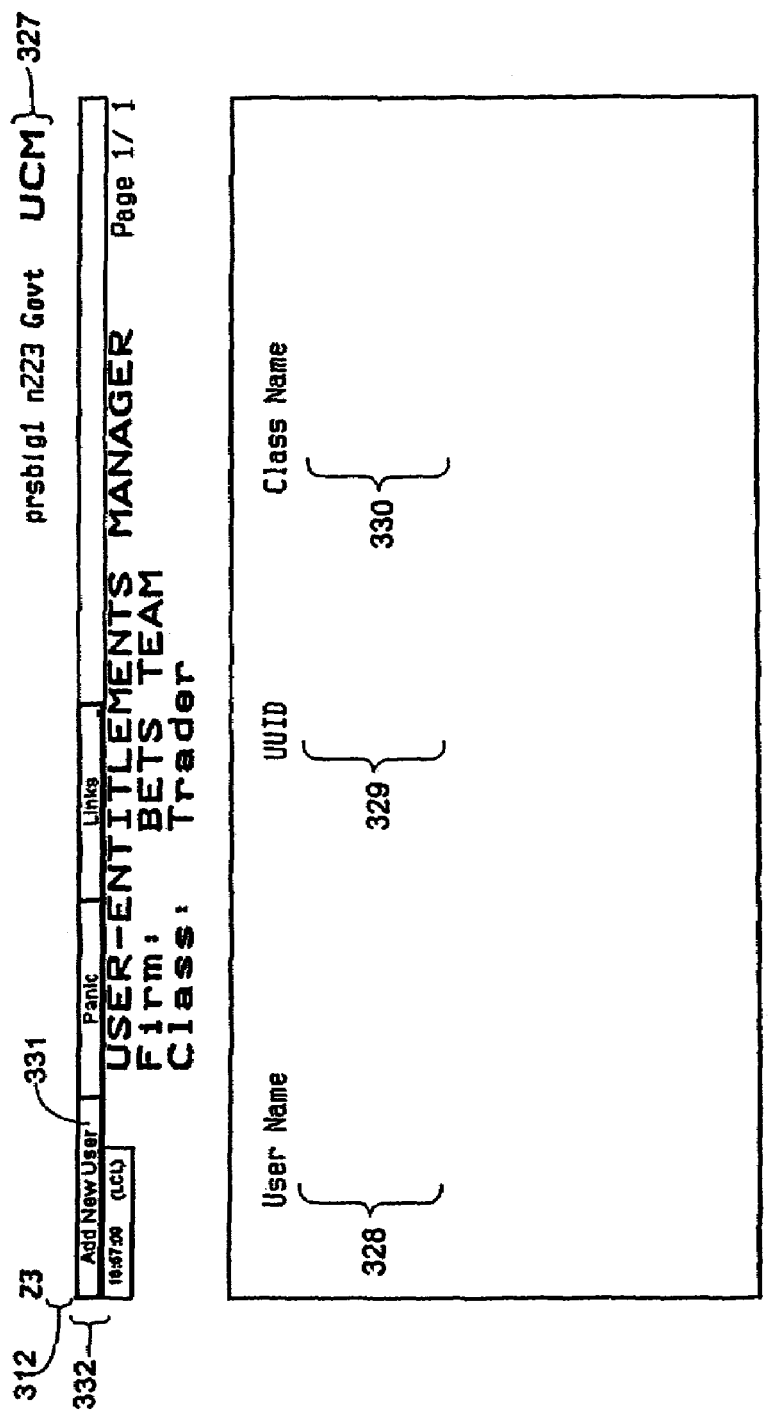

At the screen of FIG. 5 the administrator is enabled to provide a "short name" for the new class, to set security parameters, and to set options for revealing information to, for example, other traders when the new user acts in the capacity of an offeror or seller. The class short name is entered at field 307. This short name may be used, for example, in command line operations for retrieving identity information, information regarding the class, or for executing other functions such as will be discussed below. Security parameters are set by making appropriate selections and data entries at fields 308. The administrator is enabled to require members of the class to use passwords when initiating order-executing commands, as for example executing trading transactions, and to set a period in minutes following entry of a password, if required, for which the password is effective. If the password requirement option is set to "Y", as shown, then when a member of the class attempts to initiate an order-executing command, the system prompts the user for his/her password before accepting or authorizing execution of the command. At the expiration of the time period set at 308, 309, (shown as set to a default value of 15 minutes) the user's authority to initiate order-executing commands is disabled, while the authority to enter non-order-executing commands, such as commands associated with the review of offerings or the user's own blotter, is not disabled. Optionally some non-order-executing functionality is disabled also. If the password requirement option is set to "N", no password is required for initiation of order-executing commands, or for use of other functions. Default security parameters are shown at fields 309 and need not be changed for the user to be able to access the system. Options for revealing information to other traders are set or selected by making appropriate entries and selections at fields 310, with defaults being offered at fields 311. In the embodiment shown, no defaults are offered for showing high bids entered by class members to all other users, at line 340, or line 341 for enabling class members to decide whether to show their high bids or not; the class members are required to show high bids on offerings to other users.

When the administrator is satisfied with class user attributes set on the fields shown in FIG. 5, he or she is enabled to modify or set additional attributes by entering the command "PageFwd" at command line 312, or pressing a suitable dedicated key or keystroke combination. Entering the "PageFwd" command results in presentation of the screen shown in FIG. 6. At the screen shown in FIG. 6 the administrator is enabled at fields 313 to enable class members to take action on behalf of the firm, or the administrator may accept defaults offered at fields 314. The administrator may also set trading capabilities for individual class members at fields 315 or accept defaults offered at fields 316. The administrator is enabled at line 317 to authorize the user to operate on behalf of other users within the same firm; at line 318, to cancel firm bids; at line 319 to cancel firm offerings; and at line 320 to change reserves and spreads for firm offerings. Similarly, at line 321 the administrator is enabled to authorize the user to bid; at line 322 to post offerings; at line 323 to post, conditioned on further authorization, staged offerings; and at line 324 to stage offerings him- or herself. Optionally any of the capabilities assignable by the administrator at lines 310, 313, 315, and in particular any of such capabilities which may be initiated by the user to execute orders, are further subject, by default, to password use requirements as described above.

The administrator is also enabled to delete user classes by selecting item 325, or to change a class name by selecting item 326. Upon selection of such options the administrator is presented with suitable screens adapted for eliciting information such as class names to be designated for deletion or change.

When the administrator is satisfied with his or her choices, he or she enters "1" and return, or "Go", and the class is created, with attributes saved by and accessible from the database. Screen 3 reappears in the form shown in FIG. 7, with the new class name shown at line 396. By selection of items 303 the administrator is enabled to designate individual users as members of the corresponding classes 304.

The administrator is enabled to create a new individual user by selecting the appropriate item number from fields 303 in FIG. 7. Entering "23" at command line 312 results in presentation of the screen shown in FIG. 8. Where a new user is to be added to a previously-existing class or an existing class member's privileges or attributes are to be modified, a list of user names, identification ("i.d." or "UUID") numbers, and the users' associated class names are shown in fields 328, 329, and 330 respectively. Where the class is new or no individual class member entries have been created, fields 328, 329, and 330 appear blank, as shown.

Figure 9:
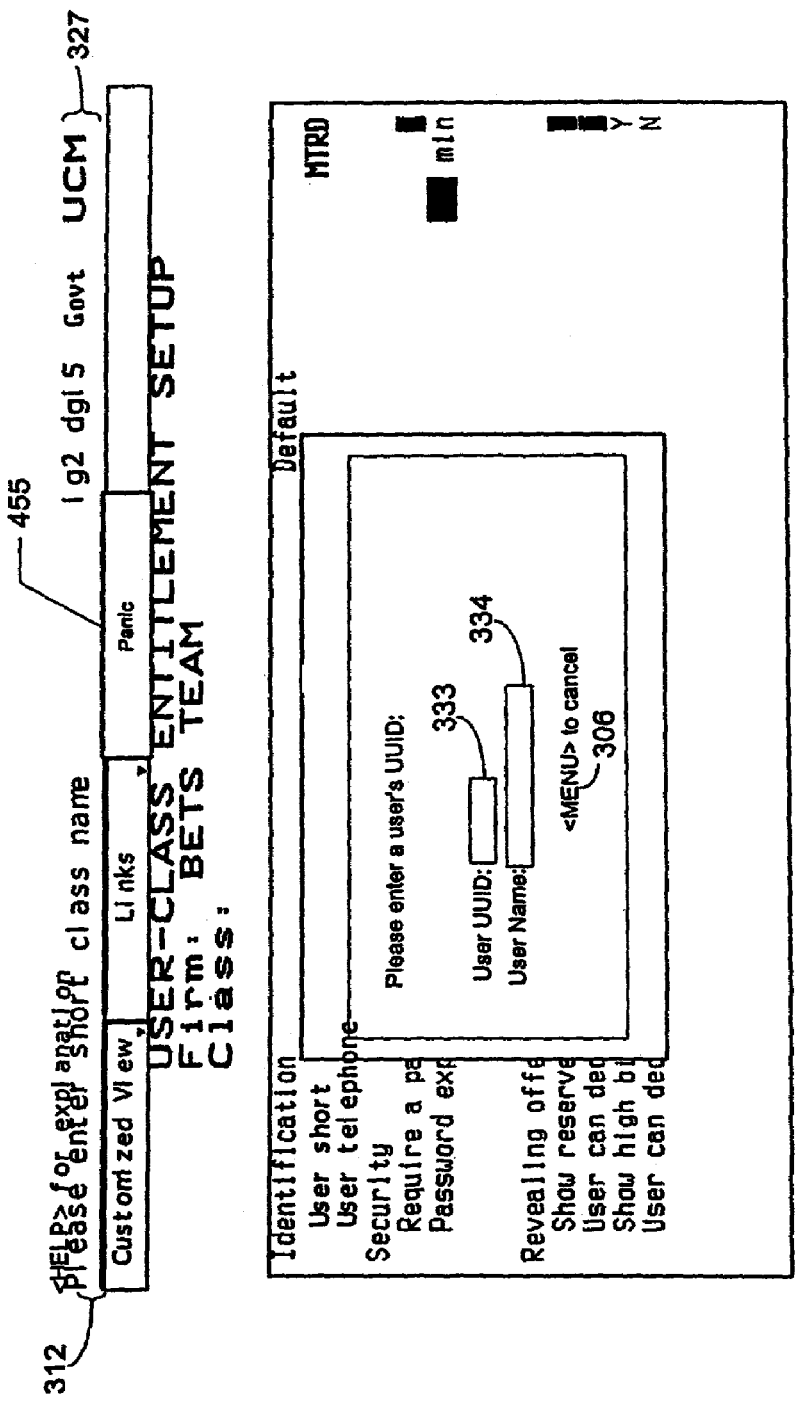

Selection of item 331, "Add New User", from toolbar 332 results in presentation of the screen shown in FIG. 9; the administrator is prompted to enter a user i.d. name in field 333 and the user's full name in field 334. The screen shown in FIG. 10 is presented as a result. The administrator is now provided with default values 335 for security parameters. Default values 335 are defined by the default set 309 provided at the screen shown in FIG. 5, but may be changed for individual users by entry of appropriate data in fields 336. Options for revealing information to other traders are set or selected by making appropriate entries and selections at fields 337, with defaults being offered at fields 338. Again, defaults are set by attributes set by the administrator for the class, but may be changed for individual users.

When a user attempts to perform a function on the system by entering a command at command line 312, for example, the system queries the user data base for proper privilege attributes for the user. If no such privilege is defined for the user, the system checks for privilege attributes at the class level. If no class privilege has been established, the system uses the defaults set by the system. In either case the use of a password may be required in order to initiate some functions, including order-executing commands.

Firm administrators are enabled to set privileges, policies, and limits to which the firm's resources, including money, may be committed by individual users, by classes, or by the firm as a whole through its aggregated users. In general, privileges for classes and for individual users are limited to those available to the firm as a whole. To set firm privileges, policies, and limits, the administrator enters an "FD" command at command line 312, resulting in presentation of the screen shown in FIG. 11. At the screen shown in FIG. 11 the firm administrator is enabled to set limits on either or both of firm bidding and offering totals in fields 342. Default limits, preferably based on discussions or negotiations with the system provider, are provided in fields 343, and are generally changeable only on authority of the system provider or underwriter. Enablement of intra-firm trading is offered at line 344.

Commitments made by a firm's individual users and by the firm as a whole are monitored by the system, by tracking bids and offers made by such individual users as the commitments are made, adding them to previous firm and individual user totals, and comparing the totals to the firm limits shown in fields 342 and/or 343. When an attempted proposed transaction would cause firm limits to be exceeded, the transaction is disabled and the user attempting the transaction, and optionally firm administrators, are presented with a suitable warning or verification/inquiry screen.

Figure 13:
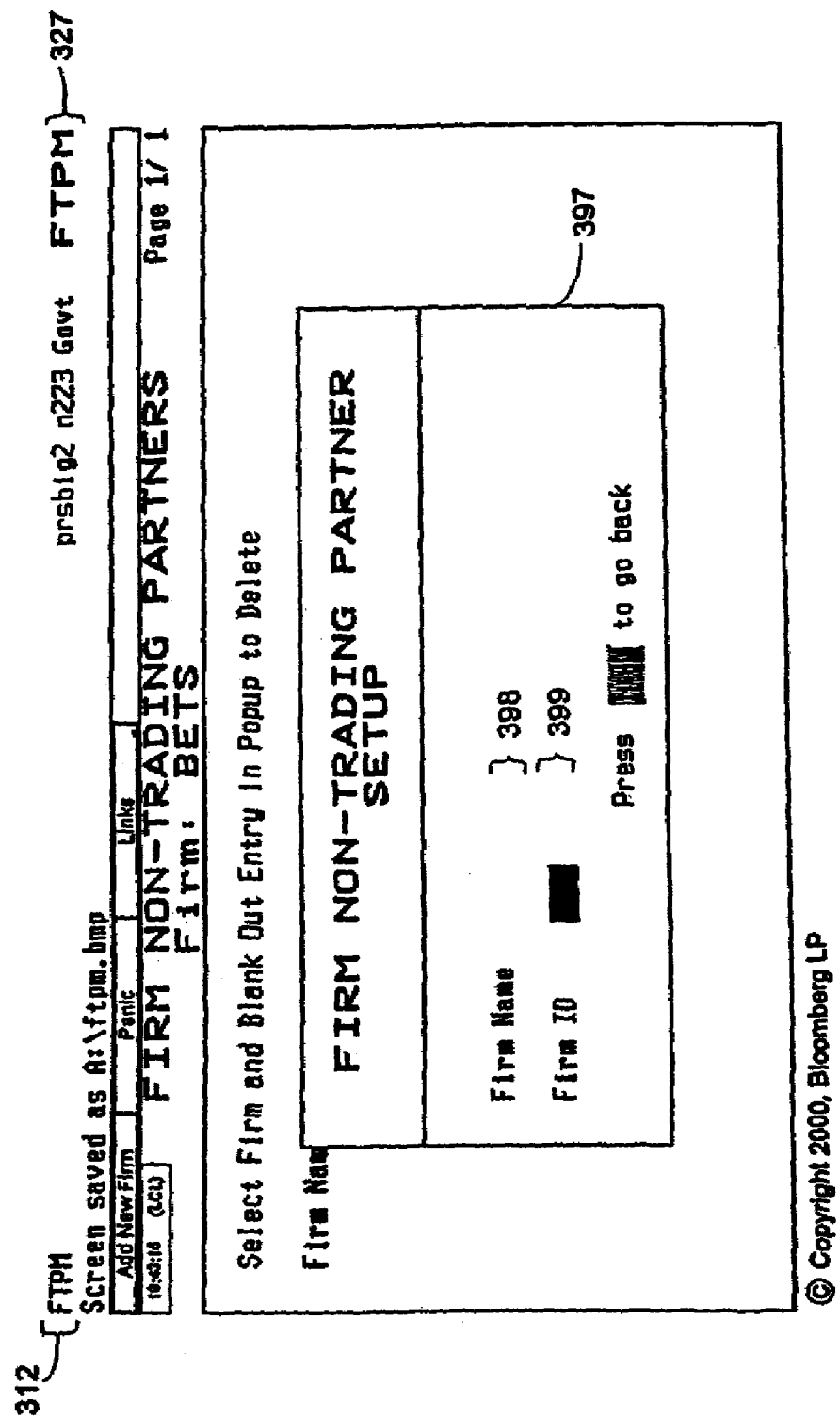
Figure 15:
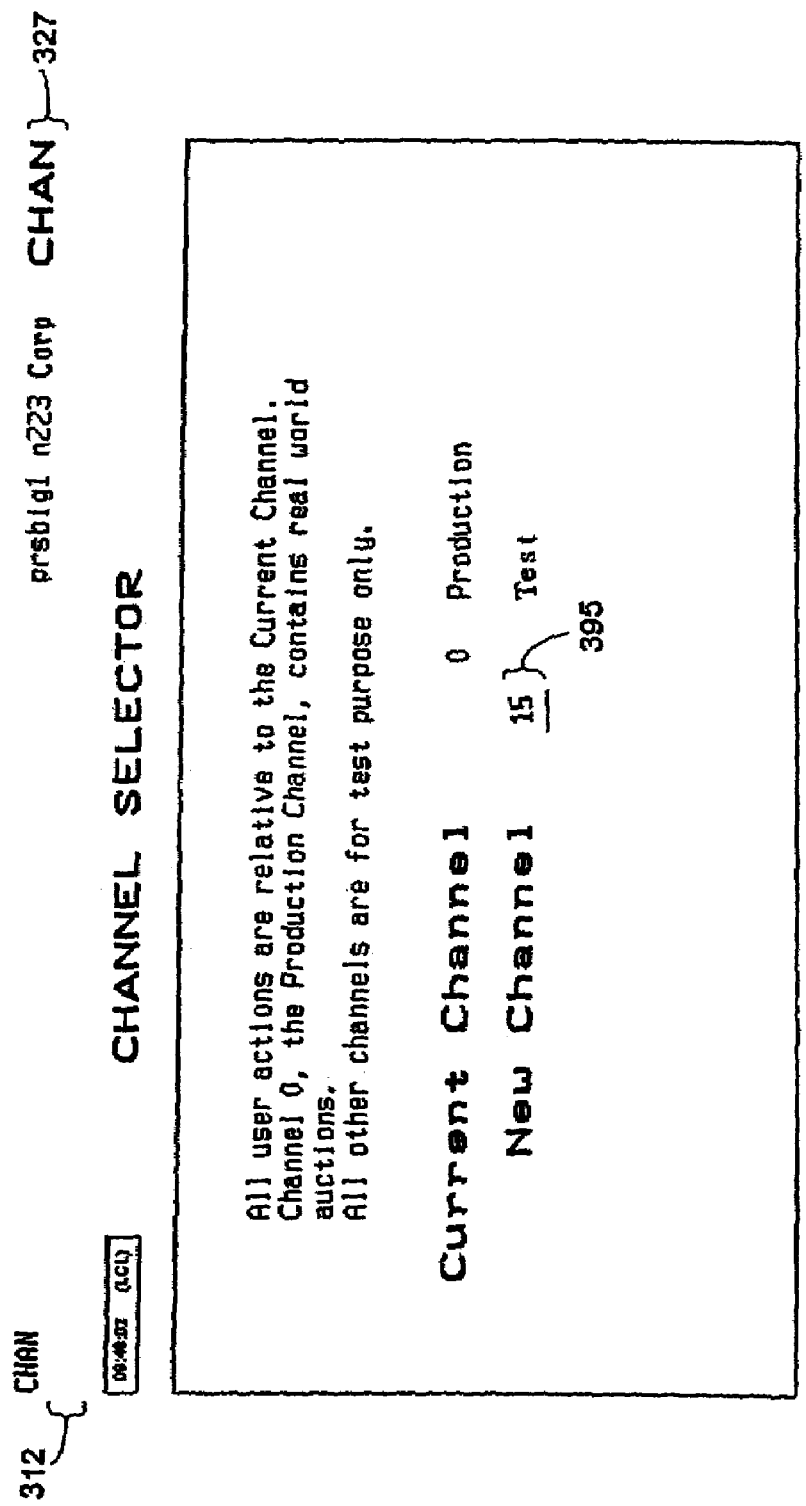

Firm administrators are also enabled to designate firms with which their own firm will not trade. To designate such firms the firm administrator enters "FTPM" at the command line 312 and is presented with the screen shown in FIG. 12. A list of firms which the firm has currently dedicated as non-trading partners, if any have been so designated, is presented in fields 346 and 347. New firms with which the firm does not wish to trade may be designated by selecting item 345 "Add New Firm" and entering the firm's name and system i.d. in fields 398 and 399 of the resulting pop-up screen 397 of FIG. 13. Firms may be reinstated as trading partners by entering the corresponding line number 346 at command line 312 and blanking out entries shown in pop-up screen as shown in FIG. 13 which results, in which fields 398 and 399 will show the firm's name and UUID.

To check or confirm firm information a firm administrator may enter "FP" at the command line to be shown the screen shown in FIG. 14.

Accessing the System

In the system described in this Example, access to the bond trading system is enabled, inter alia, through control of terminal access. Once a terminal has been granted access to the system network, any user permitted access to the terminal may view outstanding offerings, and optionally high standing bids. In preferred embodiments passwords are required only for performing certain functions such as the posting of an offering or bid.

In some embodiments of the invention terminals having access to the trading network are located in secure locations, such that members of the general public are not granted access. Alternatively, access may be made through secure connections on public terminals or networks such as the Internet, through the use of security devices such as user names, passwords, and the like. Each of these security techniques may be employed in combination with any other(s).

Preferred systems according to the invention provide two or more data sets, each data set held separate from each other, for example on different servers or data storage devices, or by employing embedded or associated data set identifiers such as tags, so that data in one data set may not be accidentally transferred to the other. In preferred systems of this type each data set is operated on by one or more instances of the same programming functionality (i.e., command functions), each executing identical, or substantially identical, operations on the separate data sets. The use of such systems facilitates testing, training, and/or practice by individual users and optionally separation of markets, by enabling fully-functional two-way simulated training parallel to actual trading channels. A preferred example comprises one data set for "production"—the entry and execution of actual trading transactions—and the other for testing, training, and practice. In order to trade with each other, users must access the same data base.

In this Example the user designates which data set he or she wishes to use by using the "channel" command. The user enters "CHAN" at command line 312, resulting in presentation of the screen shown in FIG. 15, and selects the desired channel by entering at command line 213 "CHAN XX", where "XX" is the desired channel or data set number. For example, the data set designated as "Channel 1" can be used for actual trading (or "production") purposes, and any other channels for use by individual users or groups of users for practicing trading, testing new functions, etc. The newly selected channel is shown in field 395. In preferred embodiments a plurality of non-trading, or "non-production," channels are provided, so that "private" or closed training, test, or practice sessions may be held. In addition to assuring privacy, this can help speed processing by system hardware, by use of suitable internal priority classifications and/or assignment of data processing to separate suitable processors or servers. In such embodiments it is preferred that a separate instance of all command functions be dedicated to the production channel, to avoid delays in the live trading channels and thus provide the fastest possible handling of actual transactions. The current channel or data set number is optionally shown on all function screens for constant user reference.

To reduce unnecessary costs associated with maintaining the trading system, and in particular for maintaining or providing sufficient processor memory resources, preferred embodiments of the invention comprise deleting or transferring to long term storage media such as tapes or magnetic disks all data on non-production channels on a suitably and conveniently frequent basis, preferably periodically and automatically.

Proposing a Transaction

To propose a transaction a user may enter "OFSU," together with an identification of the interest to be traded, at command line 312. The interest identification may be entered in any fashion capable of satisfactorily, and preferably uniquely, describing the interest offered. For example, an abbreviated description comprising a corporate identifier such as the corporation's stock ticker symbol, the percentage yield shown on the face of the bond, and the maturity date in form such as "IBM 6.5 01/15/28", meaning a bond issued by the International Business Machines Corporation, paying six and one-half percent interest annually and maturing on Jan. 15, 2028, as shown at item 351 in FIG. 17; or by entering the number assigned to the bond by the Committee on Uniform Securities Identification Procedures (that is, the "CUSIP" number) as shown at field 356. Entry of "OFSU IBM 6.5 01/15/28" or "OFSU 459200ASO" results in presentation of the screen shown in FIG. 16.

Figure 16:
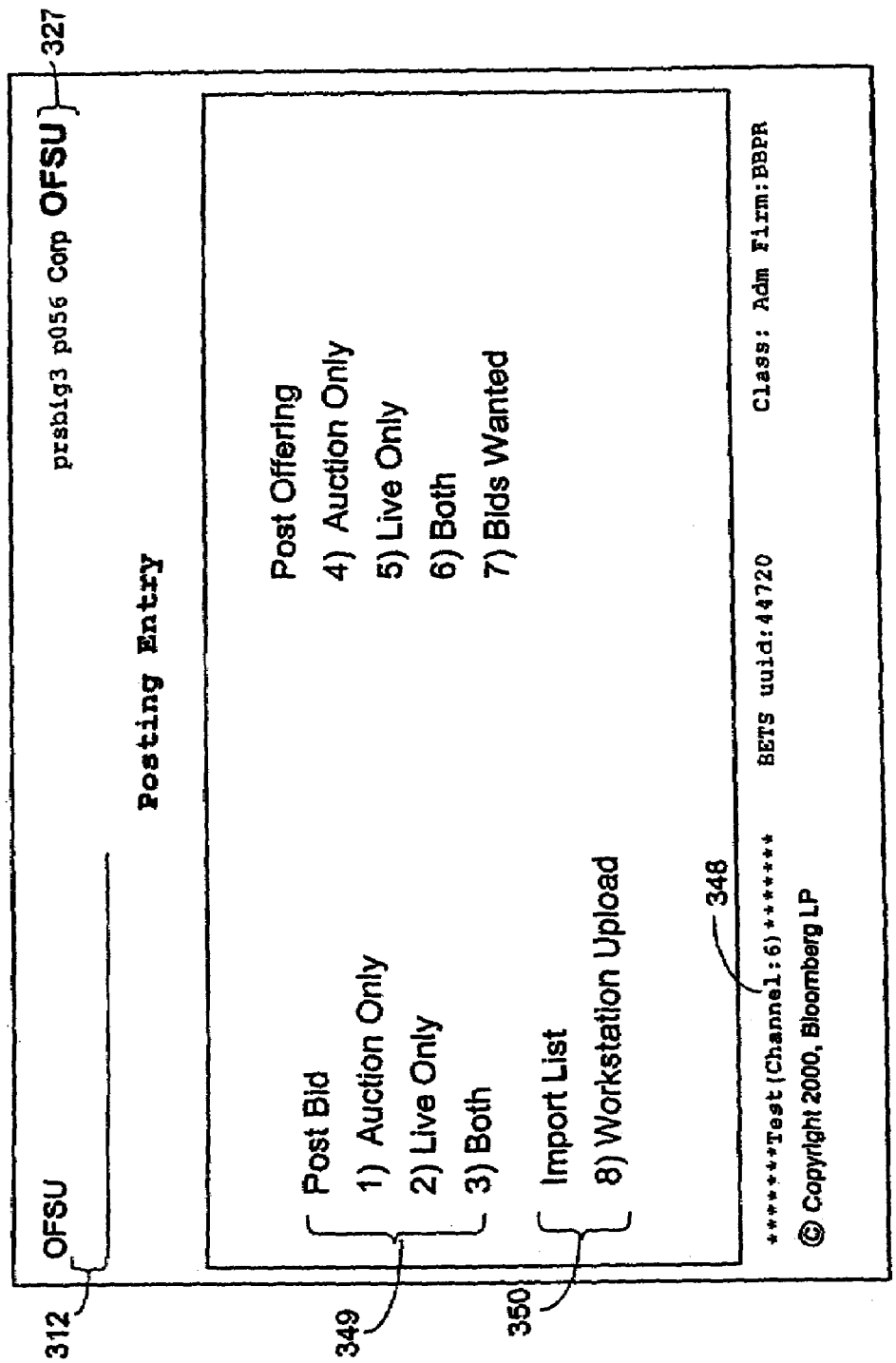

At the screen shown in FIG. 16 the user is prompted to indicate whether the proposed transaction will be for auction (either buy side or sell side), outright sale or purchase (i.e., a "live" bid or offer), or either, by entering at command line 312 the appropriate number from fields 349. The user is further enabled by entering item number "8" from optional field 350 to upload a set of offering data previously formatted by means of another computer process, such as a commercially available data base program. Such data sets can describe any number of proposed transactions.

Figure 17:
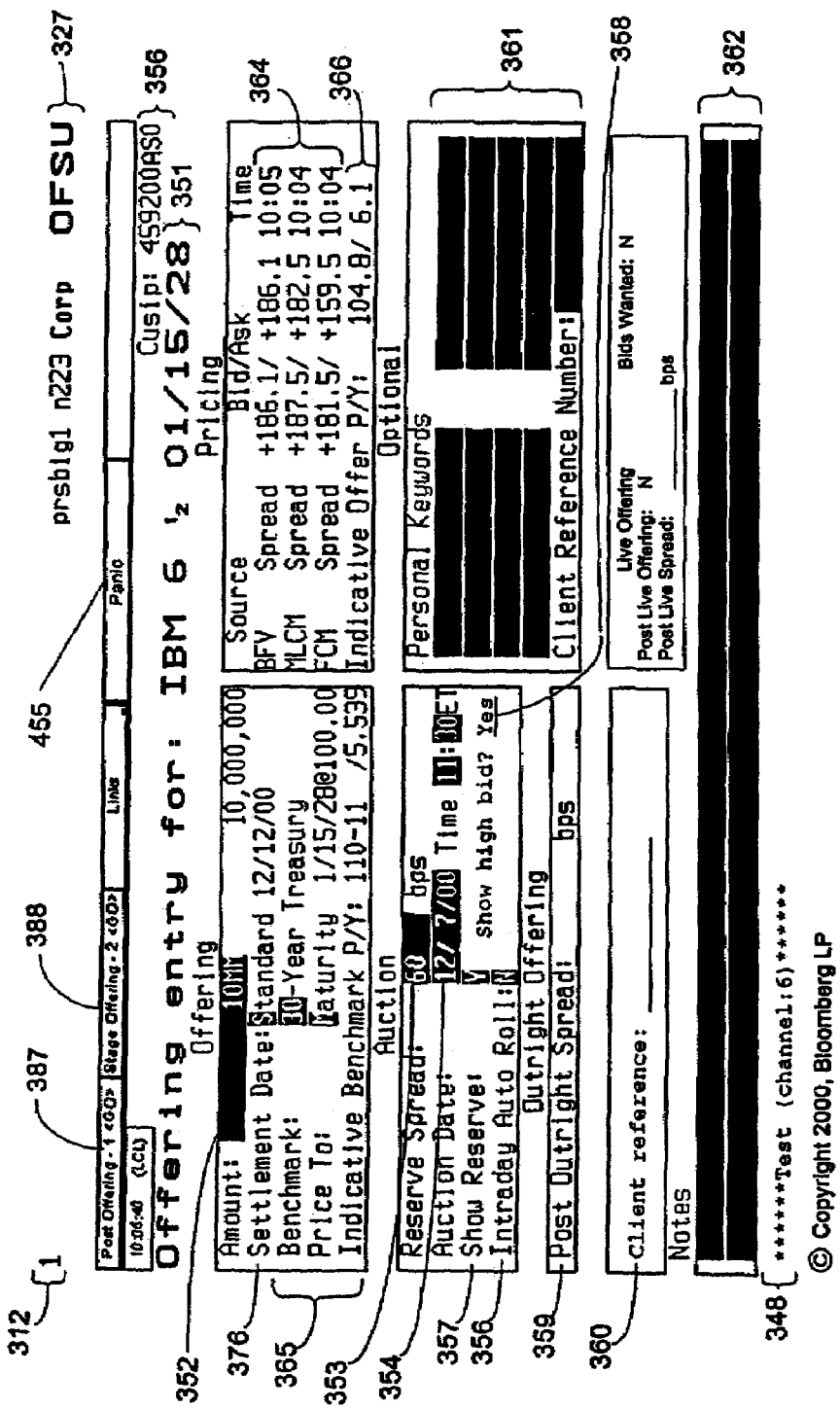
Figure 18:
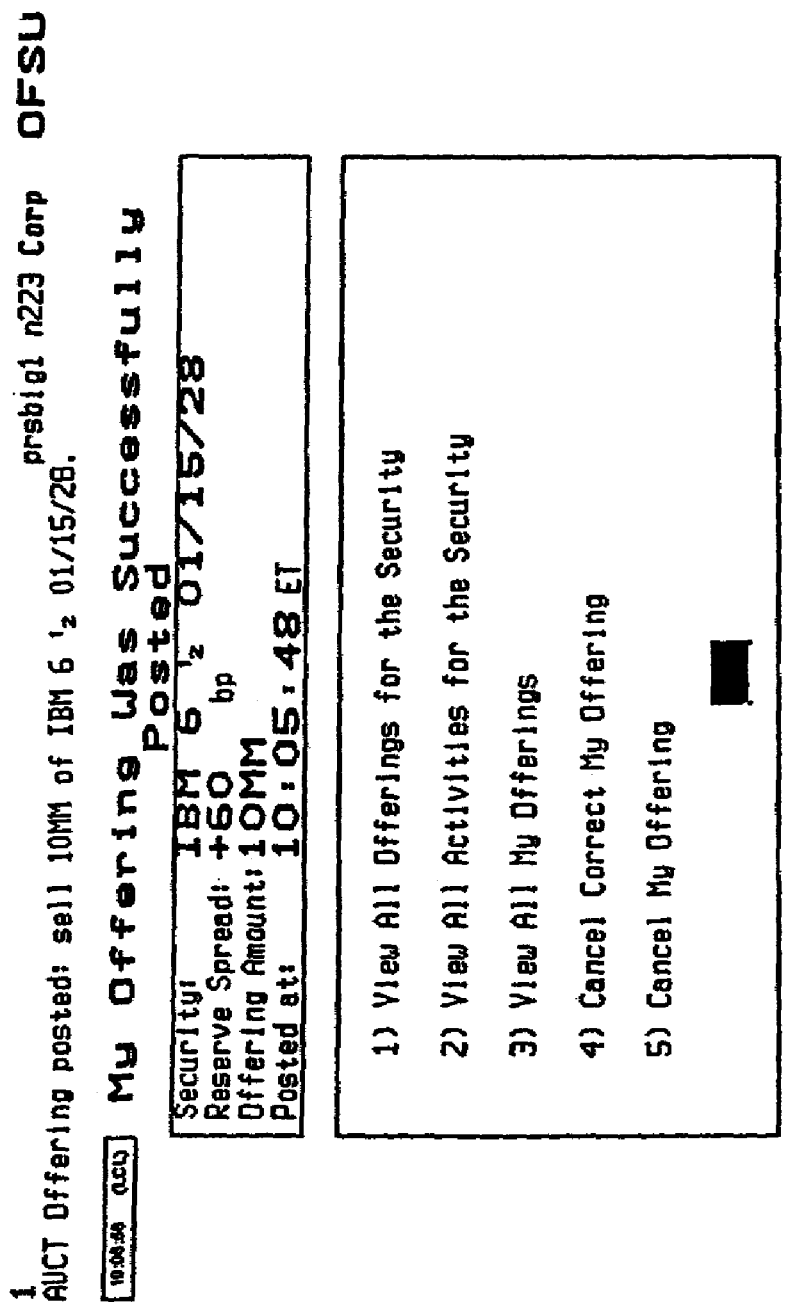

When a user enters "4" at command line 312 in response to the prompt of FIG. 16, the post offering entry screen shown in FIG. 17 is presented. The screen of FIG. 17 prompts the user for entry of data describing the bond offering. Also shown, at item 348, in the screen of FIGS. 16 and 17 is the current channel, as selected through use of the CHAN command. Optionally various input fields are presented or enabled only when they correspond to the type of transaction being proposed. For example, in a straight sale/purchase proposal Auction some or all of options 353, 354, 356, 357 and others need not be shown, or can be shown in modified format to indicate that they are not active fields, where applicable.

The user is required to enter at field 352 a par value of the offered financial interest, e.g, bond lot, and at 353 is offered the option of entering a reserve spread to indicate the lowest price, stated in terms of a spread off the benchmark price shown at fields 365, that the offeror is willing to accept.

Fields 364 and 365 show particularly useful and advantageous reference information made available to the trader proposing the trade, and optionally to traders invited to enter responsive proposals. Terms for transactions in financial interests, particularly those less frequently traded, such as corporate bonds, are often stated relative to more liquid interests, for example government bonds such as treasury issues. Financial interests used for comparisons in this fashion are sometimes referred to as benchmarks. For example, in FIG. 17 the sale of a lot of IBM 6-½ percent bonds maturing Jan. 15, 2028 is proposed via an OFSU screen in terms relative to a 30-year treasury bond benchmark, for example 6-½ percent treasury bonds maturing May 15, 2030 (a "thirty year treasury benchmark"). At field 354, for example, the entry "Reserve Spread" can be used to express a lowest acceptable price, or spread—that is, the lowest price acceptable to the offeror. This lowest acceptable price (highest acceptable yield) is expressed by the offeror in terms of basis points relative to the yield of a 30 year treasury benchmark. The stated reserve price is 60 basis points, or 0.60 percent, "over" the treasury's yield, and in particular over the effective yield of the benchmark to a hypothetical purchaser at current or recently-known market prices. This yield variation may be used, according to standard industry practice, to determine a lowest acceptable price in terms of dollars (or other monetary units) for the bonds.

Thus, preferred embodiments of the invention, and in particular those employed in the trading of corporate bonds, provide for association with a financial interest to be traded a benchmark reference, generally in accordance with standard industry practice. Optionally, the selection of the benchmark reference is made not by the trader proposing the transaction, but by a third party such as the operator of the trading system, or by industry custom. Thus in the example shown in FIG. 17 the IBM issue identified for trading is associated by the system, preferably automatically, with a 6-½ percent 30-year treasury bond issue. Alternatively, the system or system provider may provide a default benchmark, overridable by the trader proposing the transaction.

One or more prices for current or recent sales of the benchmark are shown in the third line of field 365, on terms stated in the second line thereof, as references to the trader proposing the transaction. In the third line an "Indicative Benchmark P/Y" (that is, price/yield), is shown. In the example of FIG. 17 this benchmark reference price is an average price a prospective purchaser could expect to pay, and an average effective yield that such a purchaser might expect to receive, if the benchmark bond were to be held to maturity, if the prospective purchaser purchased the benchmark at current market prices. Preferably this average price/yield is based upon at least one, and preferably more than one, most recent available sale price for the benchmark bond. For example, a weighted average of prices paid/yields taken by a plurality of established institutional traders of treasuries, collected and calculated by the system operator may be used. In the BLOOMBERG SPEX™ system, a weighted average of four prices taken from the BLOOMBERG BONDTRADER® system can be used; or the mid-point of the most recent available national best bid/offer price for other proposals or sales in the benchmark, may be used, and an effective yield determined based on such average price. Sources include such institutional traders as Morgan Stanley, UBS, and others, but numbers and identities of sources may vary depending upon factors such as trading volume and timing. For the example shown in FIG. 17, the average price/yield are 110-11/5.539. That is, the current average market price of the benchmark, weighted in terms of volumes of individual averaged sales, would be, if discussed in terms of the face value of the benchmark bonds, 110.11 percent of the face value of the bonds (i.e., for $1000 worth of bonds a purchaser would pay $1,101.10). Payment of this price for the bonds would give an effective yield to a purchaser of the bonds, if the bonds were held to maturity, of 5.539 percent annually, somewhat lower than the stated interest of 6.5 percent. This effective yield is commonly used in the industry as another way of expressing the worth of the bond.

In the example of FIG. 17, the offeror's stated lowest price of 60 basis points over the current 5.539% average reported effective yield of the treasury benchmark would result in an effective yield to the purchaser of the offered IBM lot of approximately 6.1%, or possibly lower, if a commission were to be taken by the broker closing the sale. This indicative offer yield is shown at field 366, with the equivalent price for the offered IBM lot, as shown at 366, of 104.8 percent of face value. The indicative offer price/yield shown at 366 may be referred to as a reference price.

Also shown as a reference, at field 364, is a set of recent national best bid/offer prices for the financial interest for which the transaction is being proposed. Each bid/offer set is received from a separate source not related to the trader entering the proposed transaction, and is displayed with a reference time and/or date at which the price was established. Each is received preferably from independent sources, that is, sources not connected with the offeror, and each represents the most current available data, offered or bid for the interest concerned, and is preferably reported within or close to real time.

Some or all of the reference or benchmark price sources may be accessible by individual users or user firms on an authorized basis only, as for example by subscription, or they may be provided through a system service provider free of charge. For example, Bloomberg LP of New York provides several lines of suitable bond trading data in electronic format for use in systems according to the invention. Other financial institutions and news agencies provide suitable and compatible information as well. In the example shown in FIG. 17, the prices have been received from Bloomberg Fair Value (BFV), Merrill Lynch (MLCM), and Fidelity Capital Markets (FCM). Prices are stated in terms of basis points over the stated interest of the benchmark interest identified in field 365, and are calculated by the trading system if required. Optionally prices are either received in such terms or are converted to basis points relative to the benchmark by the trading system or its operator. An advantage offered through the provision of this information is that the trader proposing the transaction can determine how close to current "market" terms his offer is, since they may be compared directly to the reserve price established by the trader proposing the transaction.

In preferred embodiments of the invention the user is enable to access interactive screens containing data input fields to help him or her in computing reserve spreads.

In the example shown in FIG. 17, an auction transaction is proposed. Auctions conducted according to the invention are preferably provided with a defined starting and ending time and date. At field 354 the offeror is enabled to enter an auction date and at 376 a standard or non-standard settlement date, based on preference and industry custom. At 359 the offeror is given another opportunity to elect, or to confirm, whether to offer the bond lot is offered for outright sale as well as auction, by either entering an acceptable outright sale spread or leaving the field blank. At 356 the offeror is given the option of rolling the proposed transaction over into a new proposal in the event that no acceptable responsive bid is received prior to the auction date or time, or close of business for a given session. For example, it is sometimes advantageous to close business at a given point during the day, as for example to facilitate accounting, etc.; in such cases the proposal is associated with a new proposal period (e.g., a new auction time) and maintained on the server database with appropriate tags, accessible by other system users according to system rules. Optionally, the user making the proposal is enabled to renew the proposal at opening of the next session. At 357 the offeror is enabled to elect to show the reserve entered in field 353 on the offering description presented to bidders, and at 358 to elect to show prospective bidders the highest bid received.

At 361 the user entering the proposed transaction is enabled to associate one or more keywords with the proposal, to facilitate rapid and efficient organization, monitoring, and searching of multiple offerings. Standard keywords may also be designated by a user's firm, for example, so that a manager, administrator, or book keeper may easily locate particular offers or sets of offers. Similarly, the offeror is enabled at 362 to enter personal notes, such as for example post special clearing instructions for the broker or agent who will complete the transaction in the case a bid is accepted, and at 360 a client reference number. Personal identifiers such as keywords, client reference, and personal notes entered at 360, 361, 362, are preferably associated, for example by means of data tags, with data sets associated with the particular proposed transaction's description and stored in such association in data bases used by the system for data storage.

Figure 11:
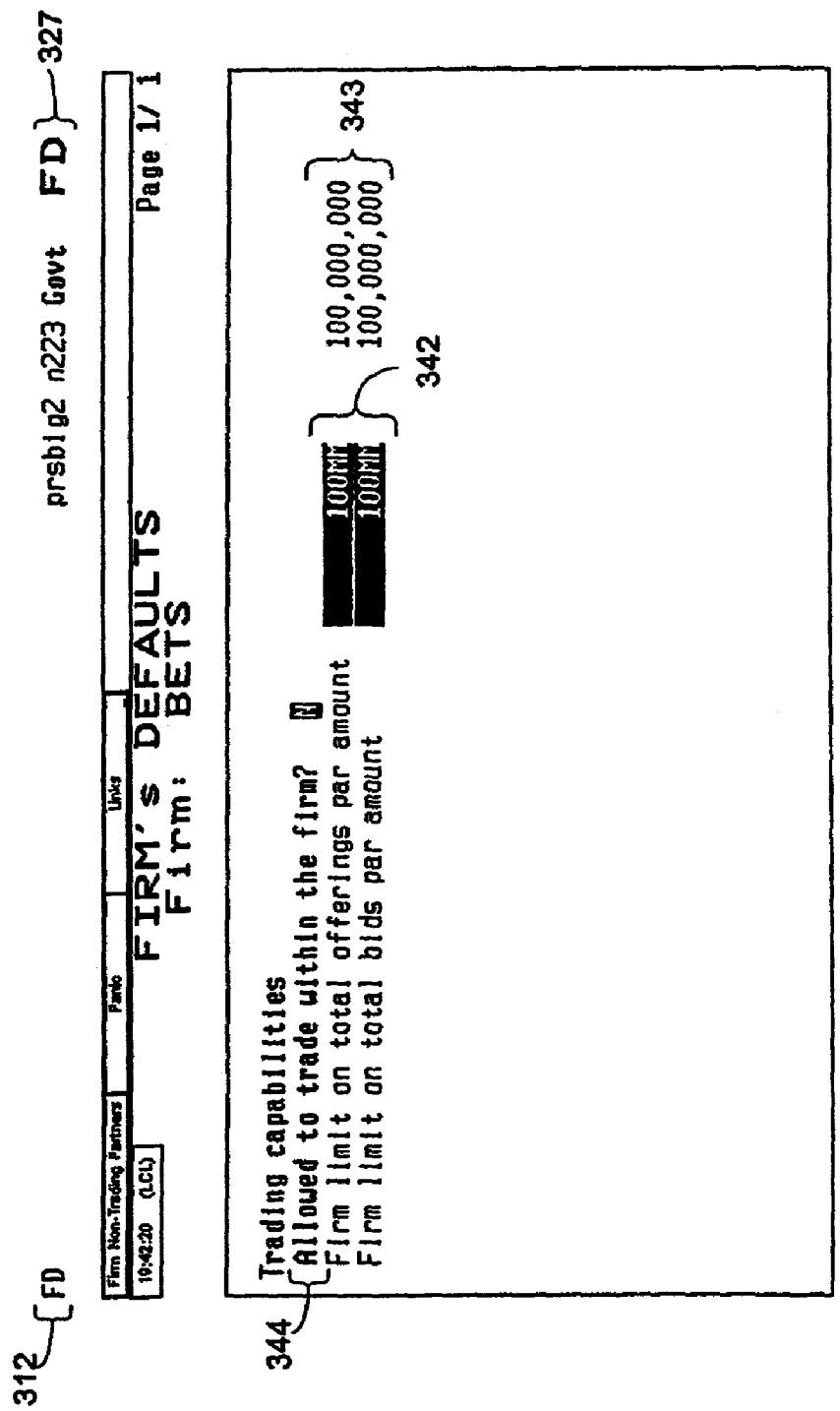
Figure 12:
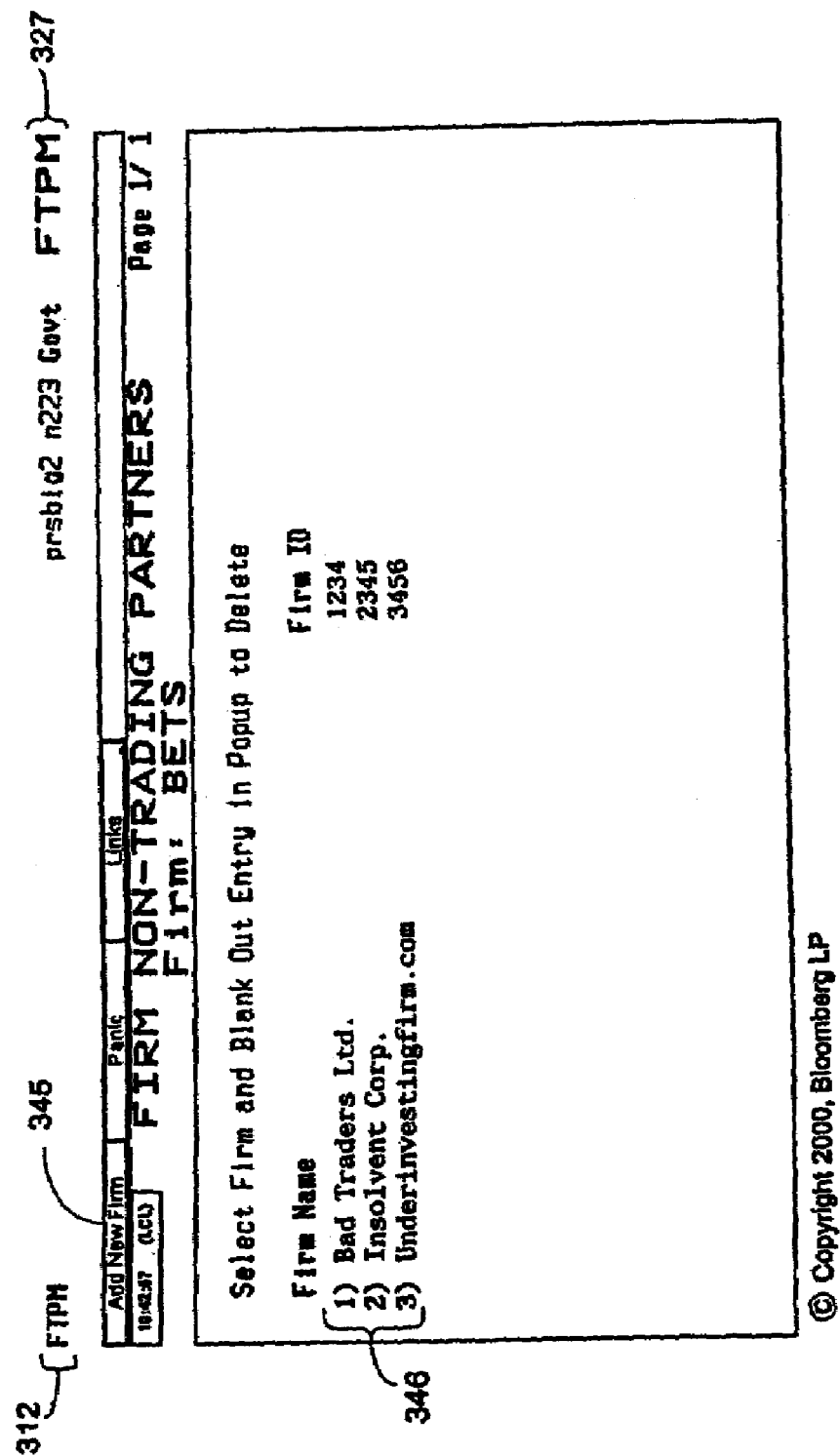

Once a suitable description of the terms of the proposed transaction has been entered, the user enters "1" at command line 312 to post the offering, or "2" to stage the offering for further consideration or review by others in the user's firm, or makes the appropriate selection at items 387, 388. In preferred embodiments of the invention, when a proposal or other order-executing command is ready and the user wishes to post the description or otherwise execute the proposal command, the user's identity is checked for authorization, to ensure that the user has been authorized to exercise the propose a transaction of suitable size, and that the proposal, if posted, will not cause the user to exceed either his or her personal, firm-assigned trading limits as discussed in connection with FIG. 10, or aggregate firm limits as shown in FIG. 11. If the user is not so privileged, or if personal or firm trading limits will be exceeded on posting, the user is so notified and the offer is held pending resolution of the discrepancy. If the user is so privileged and within assigned trading limits, a check is made to ensure that the user has entered a valid password, and, in instances in which the password is assigned a time period, that the password has most recently been entered within the assigned period. If the password is valid and has been entered most recently within the prescribed time limit, the offering is accepted and posted. If the password is not valid or has not been entered within the prescribed limit, the proposal is retained by the system database, but suspended, and the user is prompted to re-enter password. Again, the administrator who has assigned the user's password limitations has the option of setting the time limit for the password to zero, or to any other suitable figure, to require that the user enter his or her password on entry of each transaction. Confirmation of posting of the offer is made by presentation of the screen shown in FIG. 18.

Optionally the user may "stage" his/her proposal for review another user, such as for example an administrator or supervisor within his firm. The reviewing user can be assigned a supervisory or administrative authority to access to the user's proposals, and may access them, preferably upon entry of a password, to review and edit/approve/the proposals, or to cancel, hold, or postpone them if necessary before they are released for access by other system users such as prospective trading partners. When a user has elected to enter a staged offering by entering "2" at command line 312 or by selecting item 388 from the screen of FIG. 17, the menu of FIG. 19 is presented. At FIG. 19 the user is offered options of creating a new list of staged proposals or adding the current proposal to an existing list of staged proposals. Lists of staged proposals may be assigned, for example by name, to particular supervisors or administrators, or to users assigned to designated supervisory or administrative classes. Entry of "1" at command line 312 from the screen of FIG. 19 results in presentation of the screen of FIG. 20, in which the user is prompted to enter a name for the new staged offering at field 612. Entry of the name "spex" results in presentation of the screen of FIG. 21, in which data entered at FIG. 17 is confirmed, with notification at 312 that the offering has been staged. Upon entry of desired data the information is stored pending review and approval by designated users having access to the designated list (e.g., "spex"). At item 453 the user is offered the option of adding the offering to additional staging lists.

Figure 21B:
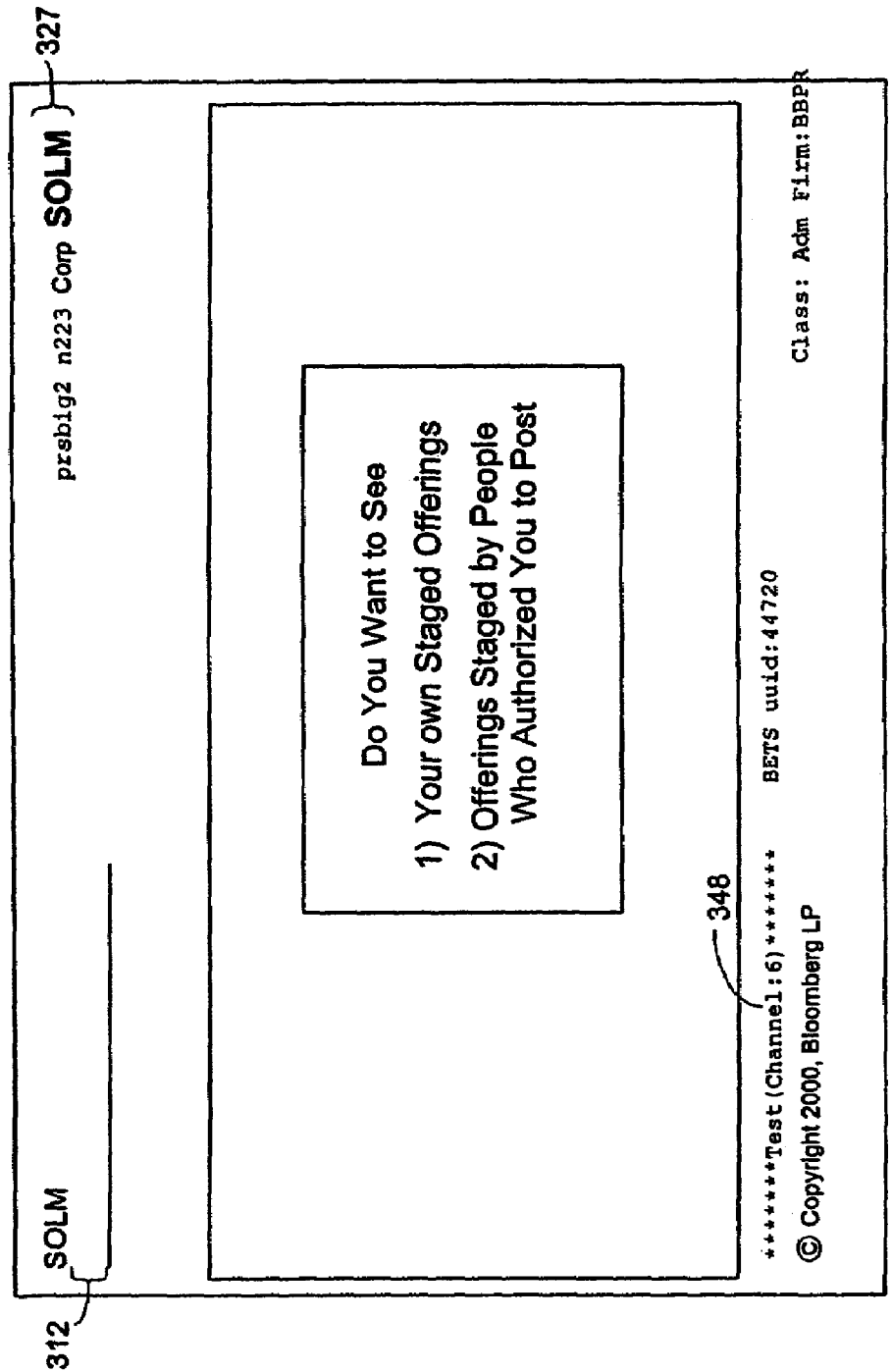

To review a staged offering, a supervising or administrative user enters "SOLM" at the command line. This results in presentation of the screen shown in FIG. 21b. Entry of option "2" at command line 312 of FIG. 21b results in presentation of a screen such as that shown in FIG. 21c. In FIG. 21c the user is presented with a list of all staged offering lists the user is authorized to access and preferably edit/approve. Entry of item number "1" at command line 312 in FIG. 21c results in presentation of a screen such as that shown in FIG. 21d. In FIG. 21d a list of all proposals in list "spex" is presented. Entry of item number "1" at command line 312 in FIG. 21d results in presentation such as that shown in FIG. 17. The supervising or administrative user is enabled to modify all fields available to the user who originally entered the data, or, by selecting "Delete Mode" item 479 beneath the command line, to cancel the proposal. Upon entry of option "1" at command line 312 or selection of item 387 by placing an "X" in field 480 in front of the suitable line, the proposal is released, or posted, for review by other users, such as potential bidders.

In preferred systems according to the invention a posted offer is cancelable at any time prior to the time posted for the auction. In addition, the reserve price, public notes, and bond lot size are changeable at any time prior to auction. The entry of a valid password is required in preferred systems to effect a cancellation.

As another example, a Bid Wanted may be entered by entry of item number 7 at command line 312 of FIG. 16. This results in presentation of a screen such as that shown in FIG. 17, but with reserve spread field 354 blank and optionally no field being given for entry of a deadline, the bid wanted being left open until close of session or until a time designated by the user making the transaction proposal. Straight offers or purchase requests may be entered in the same way.

Making a Responsive Proposal

A user wishing to enter a responsive proposal to a posted proposed transaction is enabled to review posted transactions in several ways, and to create customized filters and viewing formats through the use of the "OFVM" command.

Figure 22:
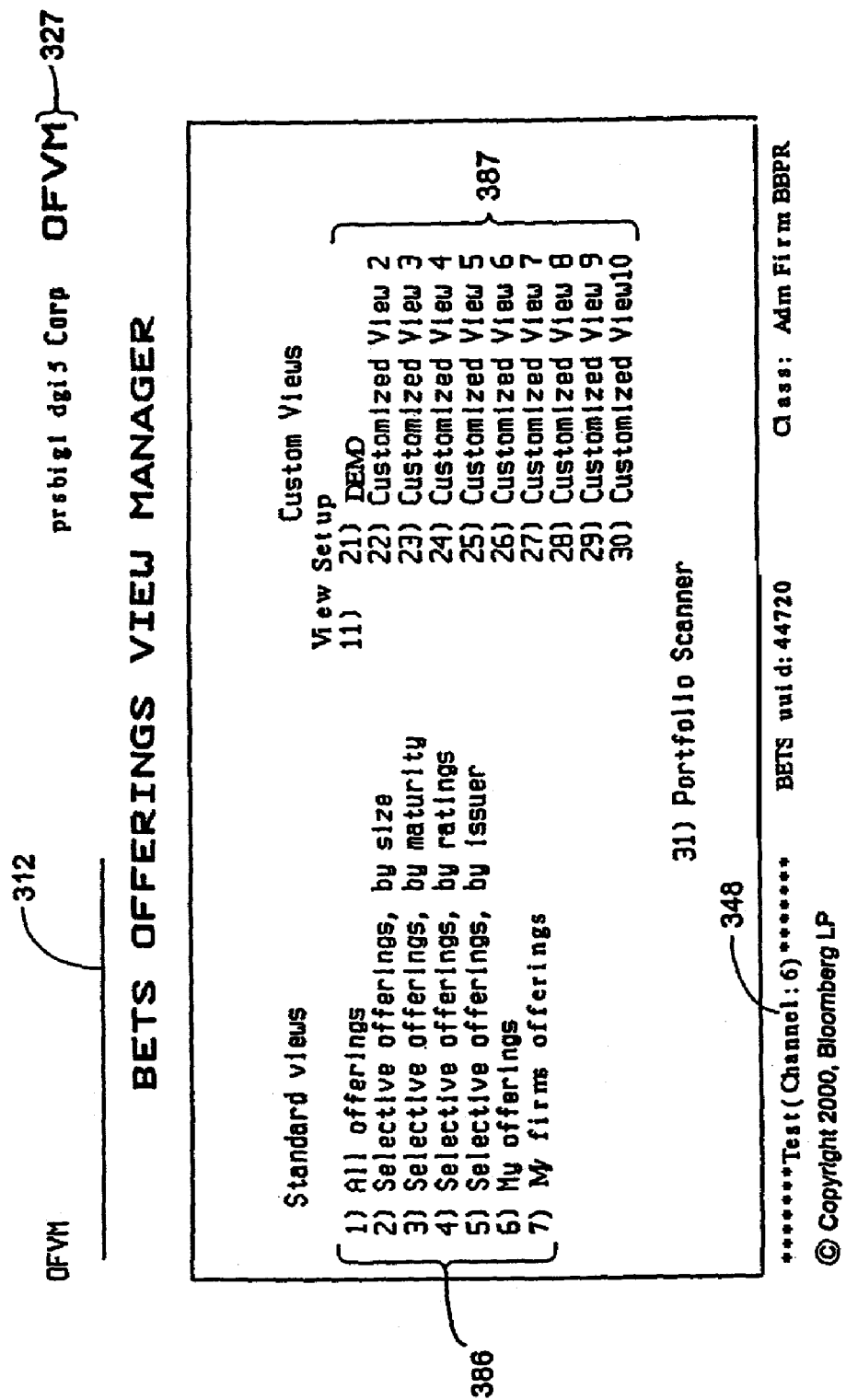
Figure 23:
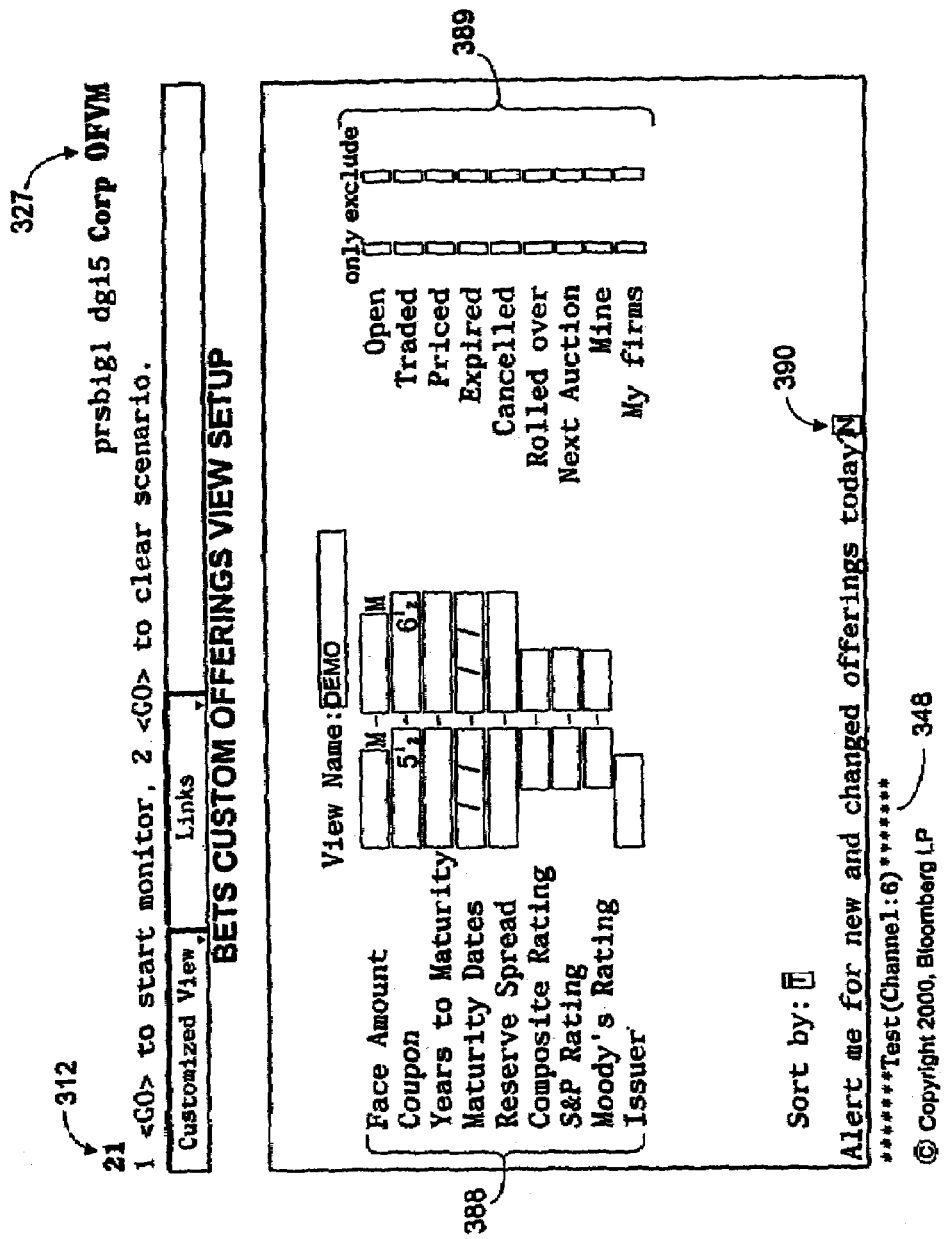

Entry of the "OFVM" command results as a default in the presentation of a screen such as that shown in FIG. 22. This screen is particularly useful where a wide variety of transactions, for example, both buy- and sell-side auctions, and buy- and sell-side straight offers, are enabled. The user is enabled to select from a number of standardized or default viewing formats and search filters, or to create and save his own formats and filter structures by reading the selections shown in fields 386 and 387 and entering the appropriate item number at command line 312. The use of various formats and filters causes, upon execution of the format or filter command, a search of the database for transaction descriptions meeting the criteria of the format or filter, and assembly of a suitable screen display. For example, entry of "21" in presentation of a screen such as that shown in FIG. 23. In this screen the user is enabled to create a filter for viewing any desired subset of offerings identifiable by means of stored data, by making suitable entries in fields 388 and 389. The user is also offered the option of saving his or her filter selections for rapid and efficient future use. Sample filters include par value or face amount of the financial interest, coupon value, years to maturity or maturity dates, reserve spreads, composite ratings, Standard & Poors, Moody's or similar rating, or issuer, and statues such as open, traded, priced, expired, canceled, or rolled over. By making the appropriate entry at field 390 the user is enabled to elect whether to be alerted for new or changed offerings.

Entry of "1" at command line 312 from the screen of FIG. 22, or optionally entry of the command "OFVM" at the command line of another screen, results in presentation of a screen such as that shown in FIG. 24, which includes a list of proposals all in the active data base, sorted by type and proposal deadlines 354. Displayed information comprises descriptions 368 of the interest at issue; indication 456 as to whether the proposal is a buy-or sell-proposal; reference or bench mark price indication 371, which may include for example all or portions of the reference information of fields 364 and 365 shown in FIG. 17; high bid listing 372 showing any entered high bid, if applicable; outright sale price 373, if applicable (note that both items 372 and 373 may be applicable); status 374 of the proposal; and indication 454 as to whether the proposal is from the buy side or the sell side. Optionally the identity of the proposer is shown also. Proposer identities can include the offeror's i.d. or merely an indication as to whether the offering is made by the user's firm or another offeror.

Figure 25:
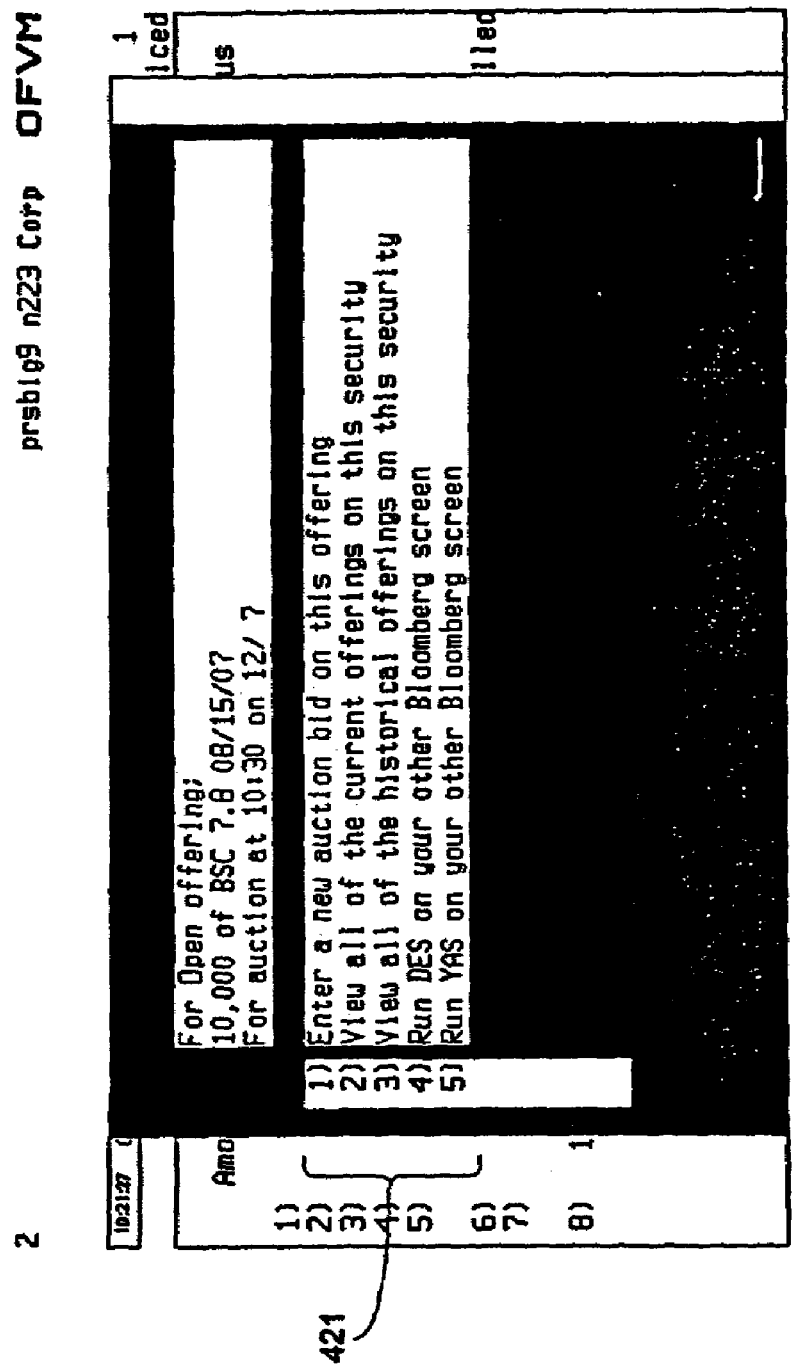
Figure 29:
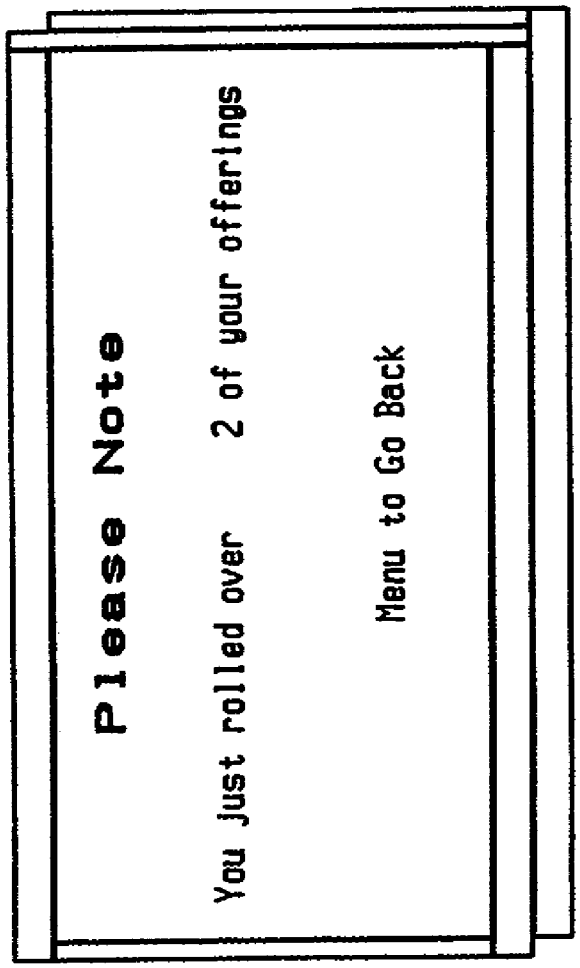

By entering at command line 312 one of line numbers 367 associated with a particular proposal as shown in FIG. 24, the user is offered options 421, as shown in FIG. 25, of entering a bid, viewing all current offerings for the selected security, viewing all historical offerings of the security, further analyzing the bond lot described in the offering through use of the "DES" command, or analyzing the effective yield of an offered bond at a given price through use of the "YAS" command. Optionally the bidder is enabled to see, in addition to those items described above and shown on FIG. 17, the seller's previous auction score, or the relative frequency with which the seller has historically successfully completed sales of his or her offerings, or to enter other types of responsive proposals, as appropriate for the selected proposal. For example, selection of an auction proposal would be result in presentation of options including entry of a responsive bid and, if applicable, a straight purchase offer.

By entering at command line 312 the line number from field 421 corresponding to the option of making a bid on an offering, the user is presented with a screen such as that shown in FIG. 26. The user's identity already being known to the system through the log-on process, and the user having previously identified the interest and the nature of the proposal through entry of the associated line number, the only required information for entering a bid is the actual offer price, entered at field 375 in terms, for example, of basis points (b.p.) relative to the benchmark price. Optionally also displayed are reference or benchmark prices in field 364 and averaged benchmark 365, settlement date 376, auction date 354, and CUSIP reference 356. The bidder is enabled to enter personal notes in field 377 and keywords in field 379. Optionally keywords displayed in field 379, clearing notes in field 378, and notes in field 377 include public keywords, clearance notes, and public notes entered by the offeror.

Once a complete responsive proposal has been entered, the user enters "1" at command line 312 and the user's identify is checked for authorization, to ensure that the user has been assigned the privilege of making bids of the attempted size, and that the bid, if posted, will not cause the user to exceed either his or her personal, firm-assigned trading limits as discussed in connection with FIG. 10, or aggregate firm limits as shown in FIG. 11. If the user is not so privileged, or if personal or firm trading limits will be exceeded on posting, the user is so notified and the bid is held pending resolution of the discrepancy. If the user is so privileged and within assigned trading limits, a check is made to ensure that the user has entered a valid password, and, in instances in which the password is assigned a validity time period, that the password has most recently been entered within the assigned period. If the password is valid and has been entered most recently within the prescribed time limit, the bid is accepted and posted. If the password is not valid or has not been entered within the prescribed limit, the user is prompted to re-enter his or her password Again, the administrator who has assigned the user's password limitations has the option of setting the time limit for the password to zero, or to some other suitable figure, to require that the user enter his or her password upon entry of each transaction, or a defined number of transactions.

A successfully entered responsive proposal is confirmed by the display of a suitable screen as shown in FIG. 27. By entering at command line 312 an appropriate selection from field 379 the user is enabled to view all offerings made for the offered bond lot, to view all of the user's own bids, or to cancel or correct the bid just entered. In preferred systems according to the invention a bid is correctable or cancelable at any time prior to two seconds before the designated auction time.

In the case of an auction proposal in which outright purchase has been authorized by the trader entering the proposal, a bidder can buy the offered lot outright by entering an appropriate offer on the screen shown in FIG. 26.

Resolution of Transactions

Once a proposal has been posted and at least one proposal suitable as a response has been received, a search of the proposal data base is made, all acceptable responsive proposals are identified and reviewed by the computer, as for example by monitor server 103 of FIG. 1, and the best responsive proposal is identified. Optionally, this best response is made available or routed to display screens in conjunction with the proposal, and is available for consideration by other potential respondents. In the case of an offer for outright purchase or sale, the transaction may be closed, either by the trading system, a designated closing agent, or by other means, at the option of the trading parties.

In auction cases, at the time designated by the offeror for auction, all entered bids or offers (auction "entries") are reviewed by the system, as for example by order matching server 104 of FIG. 1. Potential entries include not only bids/offers directed by the responding trader at the auction proposal, but also "live" bids and offers, that is, active bids and offers for straight purchase of the same or sufficiently identical financial interests, entered independently of the auction proposal by other traders. Optionally crossing auction proposals may be accepted as responsive bids/offers also. For example, a buy-side auction with a suitable stated reserve price may be crossed with a sell side auction for the same financial interest, if the auction deadlines stated by the trader entering the auction proposals are the same or sufficiently close.

If no acceptable entries have been entered, an appropriate notation may be added to the description of the proposal and displayed with the offering on lists of offerings prepared and/or displayed by the system; or a field reserved for display of best response data may be left blank. If one or more suitable entries have been entered, the system reviews them and the best responsive entry is accepted. In preferred embodiments of the invention, within 10 seconds of completion of the auction, the system informs the offeror, the bidder, and any designated brokers or closing agents that the transaction has occurred. Notification is made, for example, by e-mail and/or by suitable on-screen message. In addition, the seller's and buyer's monitor screens are updated to reflect the trade; trade blotters and auction histories available to the seller, the buyer, and all other users are updated; and the system's publicly-available volume and activity reports are updated.

In preferred embodiments of the invention a 15 minute or other desired delay is caused by the system between closing of the auction and setting of the final price by fixing of the benchmark price. This delay may be used to retrieve the most current benchmark price data available, for use in establishing the final purchase price. At the close of the waiting period the benchmark price is fixed, and the actual price determined by adding or subtracting the basis points in the spread included in the bid. If the final determined price meets or exceeds the minimum reserve price set by the offeror, or is within the reserve spread specified by the offeror, the trade is finalized and the parties notified, preferably by e-mail, on-screen notification at the parties' terminals, or other suitable means; and firm and/or individual trading limits are updated as appropriate.

In the event that no acceptable entries are received, the offeror is enabled to "roll over" his or her proposal for re-auction. The offeror is enabled, for example, to simply review a list of his or her own proposals and designate any desired proposals for renewal, with suitable auction dates and any desired changes or corrections to the offering description. This may be accomplished by entering the command "OFRO" at command line 312, which results in presentation of a screen such as that shown in FIG. 28. To roll over a particular proposal, the user may merely enter the corresponding line or item number(s) 385 while viewing the "OFRO" screen, or entering an "X" in field 457 and entering suitable data for setting the date and time of the new auction. It is also advantageous in some circumstances to be able to modify a proposed transaction upon rolling the proposal over for re-offering. In such circumstances modification may be enabled by allowing direct entry of new or modified values or parameters directly at the rollover management screen. For example, description elements in underlined data fields 460, 461, 462, 463 in FIG. 28 may be modified by typing new data directly into the fields. Moreover, the user is enabled to conveniently increment or decrement offered or reserve spreads by selecting increment/decrement items 458, as for example by selecting the items using a computer mouse or other input device. New settlement date 459 may be entered by the user or set by the system to a default rollover time. Optionally a confirmation screen such as that shown in FIG. 29 results from execution of the rollover command.

In preferred embodiments of the invention, all agreed transactions are conducted through and closed by neutral, third party agents or brokers designated by the system service provider, or optionally chosen from a list, by the buyer or seller of the of the bond, or otherwise specified; as for example as a part of closing instructions associated with the bid or offer.

Figure 39:
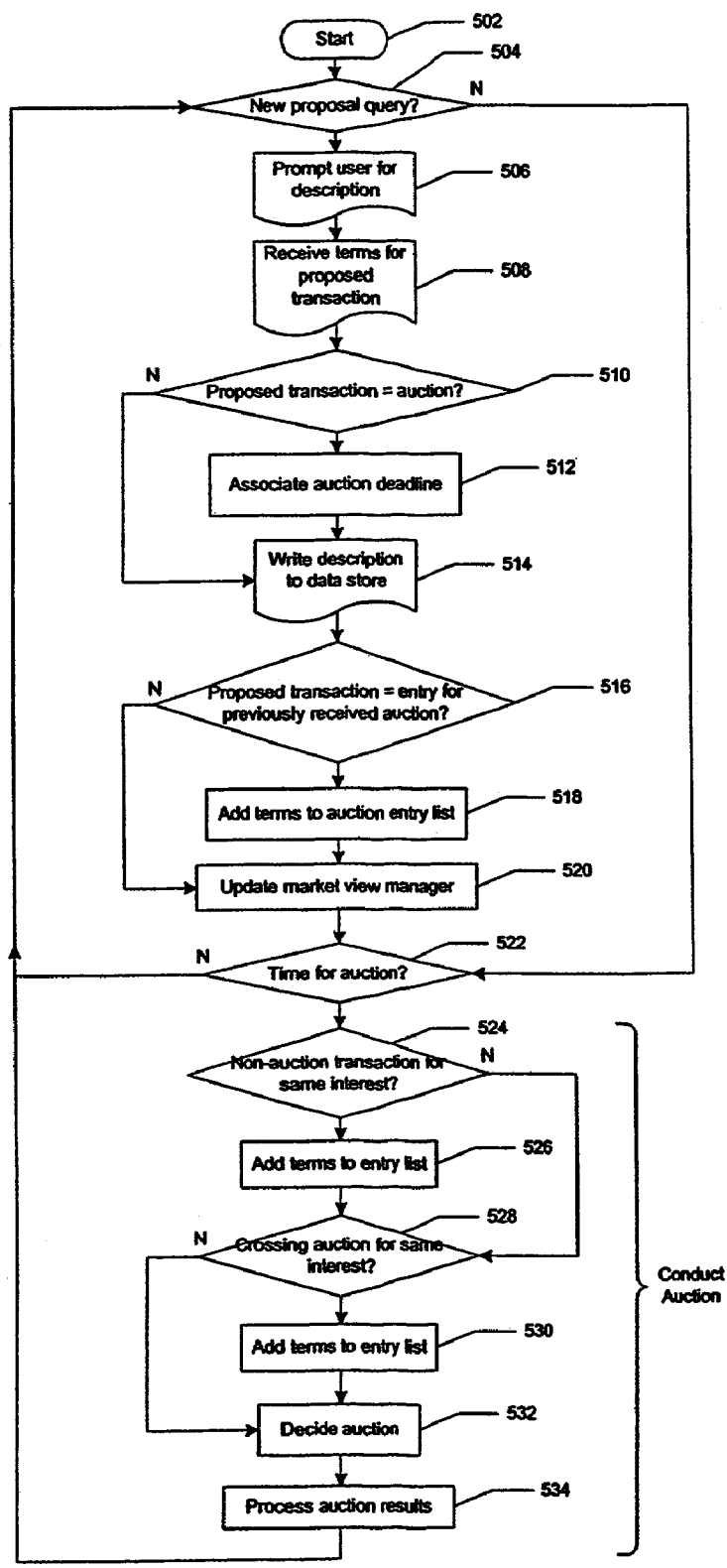
FIG. 39 is a functional diagram of a preferred embodiment for a process of deciding an auction according to the invention.

A preferred embodiment of a method for deciding auctions according to the invention is shown in FIG. 39. The method of FIG. 39 is well suited to implementation on systems such as those shown in FIGS. 1 and 2, and described in this Example. The process begins at 504 with an inquiry as to whether any user has indicated that he or she wishes to enter any new transaction proposals into the trading system. For example, the contents of a buffer or queue for receiving incoming communications from system users is read, and any new transaction proposal requests, such as a user command input "OFSU", are identified. When a request to enter a new proposal is received, the user making the query is prompted at 506 for input to complete a description of the proposed transaction. Such a prompt can take the form of, for example, the OFSU screen shown in FIG. 17.

After the user has entered elements for the description of the proposed transaction, as for example by entering data in appropriate fields in a screen such as the OFSU screen of FIG. 17, and has given a suitable command to indicate that he/she has entered all items of the description (as for example by entering "1" at command line 312 of FIG. 17), and to execute the proposal, the system at 508 reads or otherwise receives the description. If all other requirements (e.g., password authorization and credit limits have been met), at 510 the system determines whether the proposed transaction is for an auction or for a straight sale/purchase. Generally this designation is made by reading user input. For example, the user may enter data in the reserve spread field, or designate an auction deadline, or has select an "auction" option. In any case, if the user has entered an auction proposal, at 512 the system ensures that a deadline time and/or date has been associated with the auction. The deadline may be set by the user, as for example by entry of data in the appropriate fields of the screen shown in FIG. 17, or it may be set by default by the system; or it may be set by combination of the two. Upon association of the auction deadline and assurance that the proposal description is complete, at 514 the system writes a description of the proposal to the system data store and preferably makes the description available to other users, such as potential bidders, either by authorizing access to such users, as for example by posting the description to a suitable data base, or by actively forwarding the description to such users.

If the proposal description received at 508 is for a non-auction transaction, the description is written directly to the data store and made available to other users. Optionally an expiration time for the proposal is associated with the proposal, as for example by designation by the user entering the proposal, or by the system as a default.

At 516 the system determines whether the proposed transaction may be considered as a bid or other entry for a previously-received auction description. For example, if the description is for an express entry in a previously-defined auction; or for a "live" or straight purchase or sale proposal for the interest identified in the auction description, and the price bid/asked for the live proposal meets the reserve price criteria of the auction description; or if the proposal is for a buy-or sell-auction meeting the criteria of a previously-proposed sell-or buy auction, and the proposal is still active at the auction deadline, it may be considered an entry for the previously-described auction. If the new proposal may be considered as an entry for a previously-defined auction, at 518 relevant terms of the new proposal are added to the bid or entry list for the previously defined auction, and are preferably written to the system database and optionally released to other users accordingly.

In either case, at 520 the data set of proposed transactions is updated to include the new proposal, and the proposal is added to market views (such as the OFVM screen) of authorized users.

At 522 the system clock is checked to determine whether the deadlines of any auctions have arrived, and thus whether it is time to conduct any of the proposed auction transactions. If it is not time to conduct any proposed auctions, the system repeats process steps 504-520, collecting new transaction proposals and updating bid lists, market view managers, and suitable databases as appropriate.

If at 522 the system determines that it is time to conduct one or more auctions, at 524 the system checks all entered transaction proposals to determine whether any active non-auction (i.e., straight bid/offer) transactions for the interest to be auctioned (or a sufficiently similar interest) have been proposed. If so, at 526 such proposals are added to the bid/entry list for the auction to be decided. At 528, the system checks whether any crossing auctions have been proposed and, if so, at 530 adds such auction entries to the bid/entry list for the auction to be decided.

At 532 the system decides the auction in accordance with rules set by the system and/or the user proposing the auction. For example, traditional high-bid/best offer auctions, Dutch auctions, reverse auctions, and other types are all suitable for use with the invention. At 534 the system processes auction results by, for example, notifying the party proposing the auction and the party(ies) winning the auction and/or forwarding details of the auction to a broker or other closing agent. Thereupon the process resumes from 504. Optionally, loop 522-534 is carried out as a parallel process to that of loop 504-520, so that both processes are conducted independently and simultaneously.

Monitoring Offering and Bidding Activities; Canceling Proposals

Figure 30:
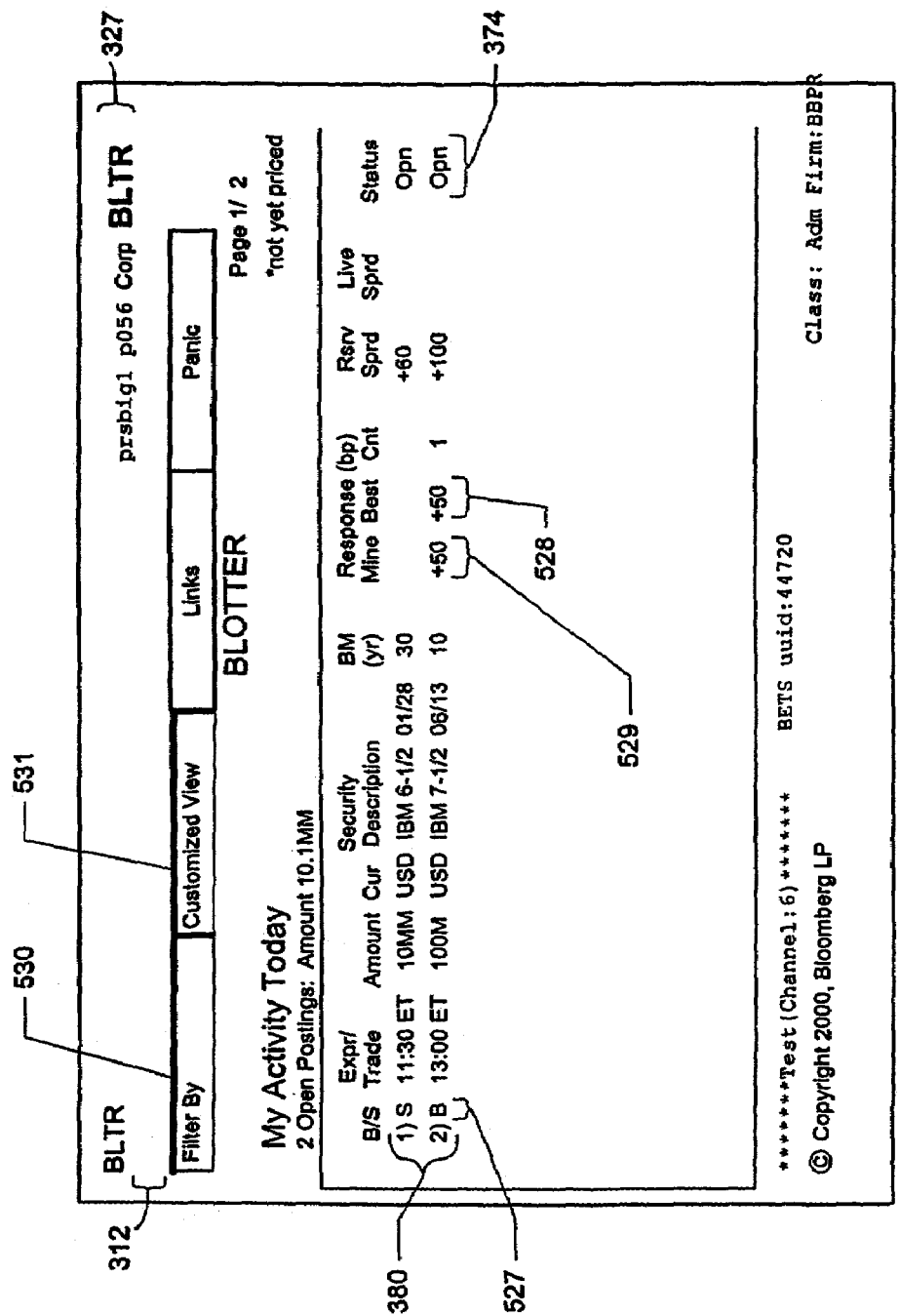

Entering "BLTR" at command line 312 from any screen results in the presentation of a screen such as that shown in FIG. 30, which shows each of a user's own transactions and/or proposals. In field 380 of FIG. 30 a user's auction offer is shown on line 1 and an auction bid on line 2, as reflected by the use of "S" and "B" in column 527. The offer corresponds to the offer shown in FIG. 17. Field 374 comprises indications that both the offer of line 1 and the bid of line 2 remain open. High bids for the auctions are shown in column 528, the user's own bids in column 529. Listings may be filtered and sorted, and views customized, through the use of items 530, 531. For example, views and filters may be customized using standard proposal terms, such as expiration deadline or auction time, or through the use of user-assigned identifiers such as keywords. Optionally selection of the items 530, 531 results in presentation of a drop-down menu showing previously-defined default and user-created filters and views.

To cancel or revise an open or pending proposal, to view details of the proposal, or to use the YAS or DES command functions in association with a bid or offer, the user enters the line number of the proposal from field 380 at command line 312, resulting in the presentation of a screen such as that shown in FIG. 31. Desired action may be initiated by entering the appropriate line or item number from field 382.

Consummated and proposed transactions entered by the user or by others may be monitored also through use of various filters. Preferred systems according to the invention provide a variety of standard, convenient pre-defined filters. For example, entry of the "BHIS" command and optionally a user i.d. at command line 312 causes display of all responsive proposals associated with that user i.d., as shown in FIG. 32. If no UUID is entered, the user's own UUID is used as a default; by using the firm's UUID or that of another trader within the firm desired bids may be viewed. At 464 the status of such responsive proposals is given. A number of status indicators may be used, as for example, "OPN" for proposals which are still open, "TRD" for proposals which have resulted in accepted or consummated trades, "CXL" for cancelled proposals, and "EXP" for expired proposals. Supervisory or administrative users may be shown screens which further include a user identification and other information useful in supervision and/or administration.

Entry of "FOFH" results in a showing of all of a firm's offering history for an optionally specified time period, as shown in FIG. 33, which presents among other proposal details an identity 471 of the user who initiated the proposal. Use of the "MOFH" command results in a display of a user's own offerings, as shown in FIG. 34. Optionally filters such as the dates shown in fields 472 may be entered directly, as an alternative to working through the Filter item located beneath command line 312.

Entry of the "OFH" command results in presentation of a screen such as that shown in FIG. 35, listing all offerings in the system pending during a user-specified time period. In FIG. 35 a number of offerings are shown in item lines 589. Information displayed comprises auction times 354, par values 352, bond descriptions 351, and status indicators 381. Bids and offerings displayed on screens such as those shown in FIGS. 30-33 may be selected from all offers recorded in the active data base, and may be filtered by use of keywords 361 shown in FIG. 17 or by other suitable data values.

Figure 36:
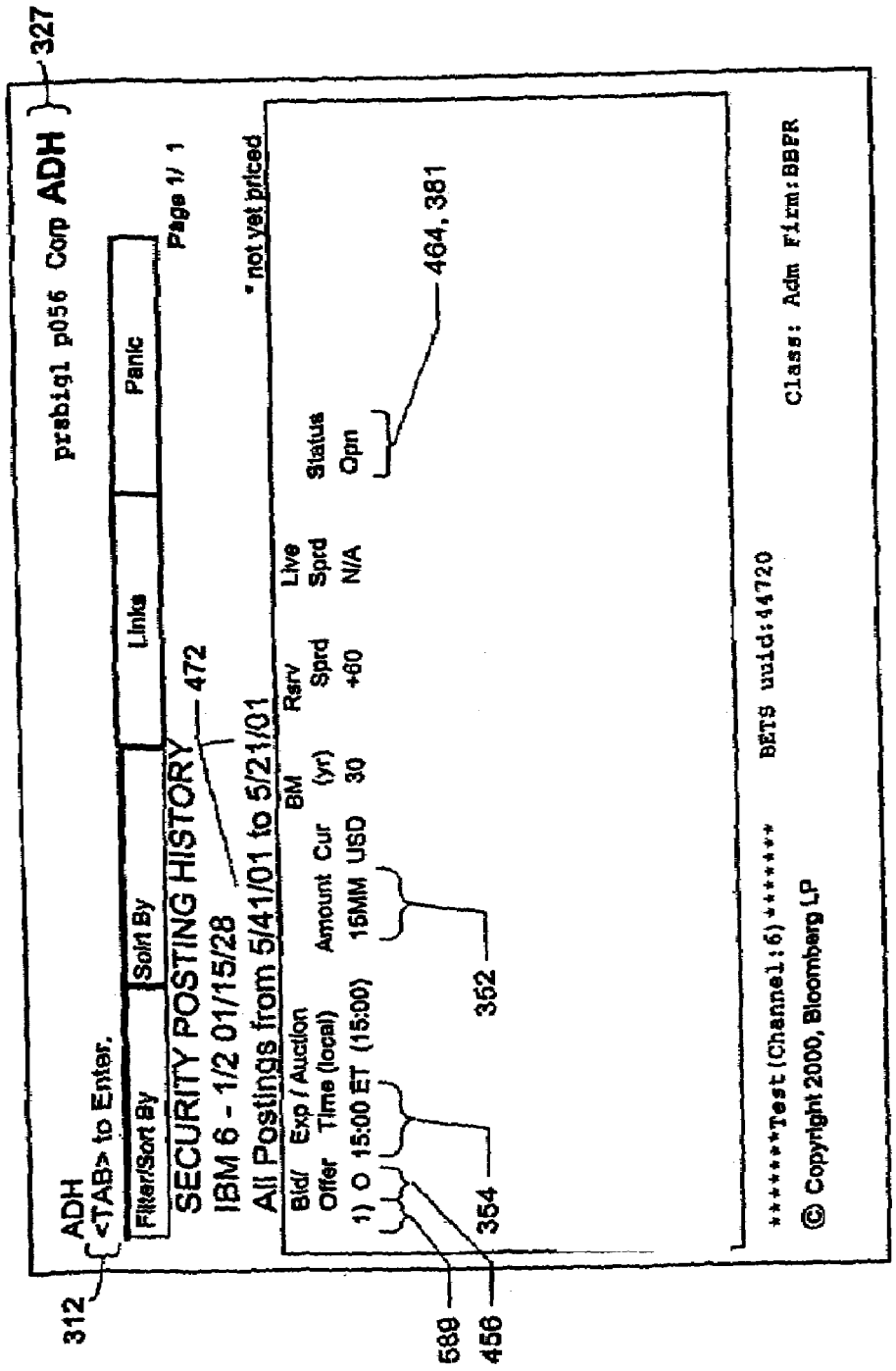

The history of the offerings of a particular security or other financial interest may be viewed through use of a command such as the "ADH" command, as shown in FIG. 36. The trade history of a specified user, which might include either an individual, a firm, or a group of users within a firm, may be viewed through use of the "TRDH" command, as shown in FIG. 37.

In each of the foregoing monitoring screens details of a listed proposal or transaction, optionally with revision or cancellation capability, may be recovered by entering the line number 589 associated with the proposal.

As stated and shown in the figures, the "BLTR" and other commands can be used to cancel individual bids or offerings. In the event of emergency, however, it is can be advantageous to be able to cancel all of a user's (including an entire firm's) offerings and/or bids at once, through use of the smallest possible number of data entries in the shortest possible amount of time. In accordance with the Example embodiment of the invention this is easily accomplished by entering the command "PBTN" at command line 312, or by selection (as for example by use of a computer mouse or other controller) of "Panic" item or icon 455, which appears in FIG. 17 and others. Panic item 455 can appear on any or all screens presented to the user, particularly where the user has logged into the trading system by means of a password. Optionally execution of the Panic command requires use of a password as described herein. Entry of the "PBTN" command results in presentation of a screen such as that shown in FIG. 38.

Figure 38:
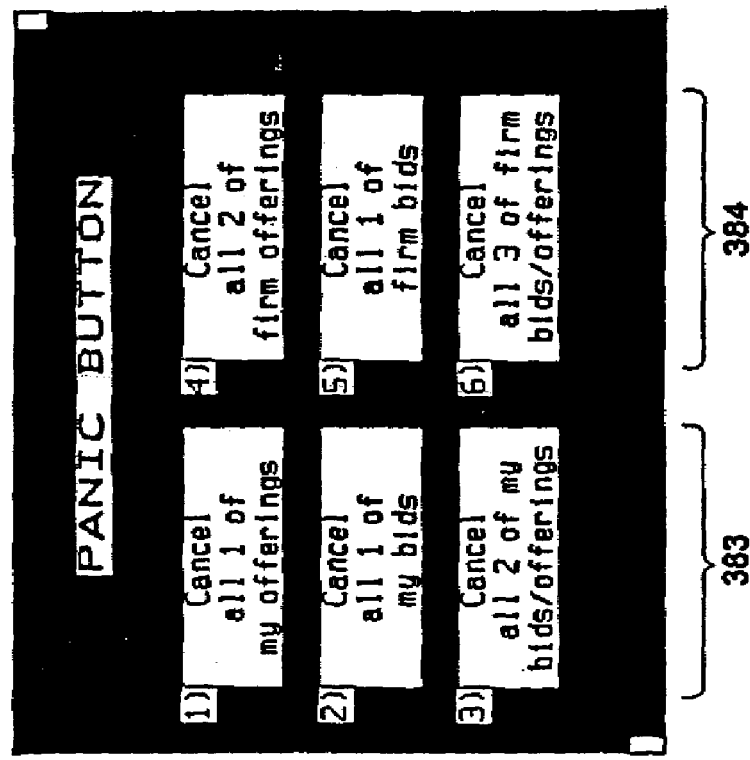

Invocation of the "PBTN" command results first in a review by the system of the user's privileges. If the user is authorized only to enter his or her own transactions, only items such as those shown in fields 383 are shown. If the user is authorized to review or cancel all of a firm's offerings, items such as those shown in fields 384, which enable rescission of proposals made by other users belonging to the firm, are shown also. Preferably items 383, 384 reflect not only the type (e.g., bid or offer) of transaction to be canceled, but also the number of such transactions, as shown in FIG. 38. Selection of the appropriate item from one of fields 383 or 384 results in a review of the proposal database and cancellation (i.e., rescission) of all of the user's, or his or her firm's, offers and/or bids, at a single keystroke or single command line input, or input from another interface controller, such a mouse or trackball. Optionally, a user may be authorized to rescind some subset of a firm's proposed transactions in addition to his or her own. For example, a user may be authorized to cancel all of the outstanding bids and/or offers entered by a single class or use of a firm's users.

Thus the rescission of a plurality of proposed transactions is enabled by entry of the single computer command comprising entry of the command input "PBTN" or selection of "Panic" field 455 from the command bar of screens such as those of FIG. 4, 9,10, or 17 and selection of the appropriate option 383, 384 from the resultant options screen, by a user authorized to enter or approve said transactions. The rescission process thus demonstrated is interactive, comprising the prompt of the PBTN screen and responses such as selection of the appropriate options 383, 384. Optionally a confirmation screen (not shown) is presented in response to entry of one or more of options 383, 384. Such a confirmation screen could comprise a summary or restatement of the selected option 383, 384, and enable the user to enter a responsive "yes" or "no" input.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

What is claimed is:

1. A method of facilitating trading of financial interests over a network using a system comprising a plurality of user computers and at least one other computer, the method comprising:

the plurality of user computers receiving from the at least one computer over the network (a) terms for a proposed auction in at least one financial interest and an associated deadline for deciding the proposed auction and (b) terms for at least one proposed non-auction transaction in the at least one financial interest which is identified in memory accessible by the at least one computer as an entry in the proposed auction but is not disclosed to the plurality of user computers as an entry in the proposed auction prior to the deadline; and after the deadline, the at least one computer deciding the proposed auction with the proposed non-auction transaction as an entry if the proposed non-auction item remains an entry in the proposed auction after the deadline.

2. The method of claim 1, wherein the at least one financial interest comprises at least one fixed-income security.

3. The method of claim 2, wherein the at least one fixed-income security comprises at least one corporate bond.

4. A computer program product, comprising a computer program stored on a computer readable medium or media that causes a computer system comprising a plurality of user computers and at least one other computer to perform a method, comprising:

providing over the network to the plurality of user computers from the at least one computer (a) terms for a proposed auction in at least one financial interest and an associated deadline for deciding the proposed auction, and (b) terms for at least one proposed non-auction transaction in the at least one financial interest which is identified in memory accessible by the at least one computer as an entry in the proposed auction but is not disclosed to the plurality of user computers as an entry in the proposed auction prior to the deadline; and after the deadline, deciding the proposed auction with the non-auction transaction if the non-auction transaction remains as an entry in the proposed auction after the deadline.

5. The product of claim 4, wherein the at least one financial interest comprises at least one fixed-income security.

6. The product of claim 4, wherein the at least one fixed-income security comprises at least one corporate bond.

7. A computerized system that facilitates trading of financial interests over a network, the system comprising a plurality of user computers, at least one other computer and a computer readable medium or media that stores a computer program that causes the computer system to:

provide over the network to the plurality of user computers from the at least one computer (a) terms for a proposed auction in at least one financial interest and an associated deadline for deciding the proposed auction, and (b) terms for at least one proposed non-auction transaction in the at least one financial interest which is identified in memory accessible by the at least one computer as an entry in the proposed auction but is not disclosed to the plurality of user computers as an entry in the proposed auction prior to the deadline; and after the deadline, decide the proposed auction with the non-auction transaction if the non-auction transaction remains as an entry in the proposed auction after the deadline.

8. The system of claim 7, wherein the at least one financial interest comprises at least one fixed-income security.

9. The system of claim 8, wherein the at least one fixed-income security comprises at least one corporate bond.

* * * * *